United States Patent
Owen et al.

(10) Patent No.: US 11,032,691 B2
(45) Date of Patent: *Jun. 8, 2021

(54) OPERATION OF DEVICE AND APPLICATION DISCOVERY FOR A MANAGED NETWORK

(71) Applicant: ServiceNow, Inc., Santa Clara, CA (US)

(72) Inventors: Bradley Owen, San Diego, CA (US); Joshua Gerbasi, San Diego, CA (US); Amit Chandulal Dhuleshia, San Diego, CA (US); Amit Arom-Zohar, Santa Cruz, CA (US); Gregory Grisco, San Diego, CA (US); Chris Nguyen, San Diego, CA (US); Oron Subayi, Rishon LeZion (IL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/418,731

(22) Filed: May 21, 2019

(65) Prior Publication Data

US 2019/0342744 A1 Nov. 7, 2019

Related U.S. Application Data

(63) Continuation of application No. 15/815,436, filed on Nov. 16, 2017, now Pat. No. 10,341,841.
(Continued)

(51) Int. Cl.
*H04W 8/00* (2009.01)
*H04L 12/26* (2006.01)
(Continued)

(52) U.S. Cl.
CPC ......... *H04W 8/005* (2013.01); *H04L 41/0853* (2013.01); *H04L 41/22* (2013.01);
(Continued)

(58) Field of Classification Search
CPC . H04L 41/0806; H04L 41/0853; H04L 41/22; H04L 41/5058; H04L 43/12; H04L 67/16; H04L 67/28; H04W 8/005
(Continued)

(56) References Cited

U.S. PATENT DOCUMENTS

| 5,796,951 A | 8/1998 | Hamner et al. |
| 5,978,594 A | 11/1999 | Bonnell |

(Continued)

FOREIGN PATENT DOCUMENTS

WO 2017059324 A1 4/2017

OTHER PUBLICATIONS

Servicenow, ServiceNow Documentation, Nov. 8, 2017.

*Primary Examiner* — Robert J Lopata
(74) *Attorney, Agent, or Firm* — Fletcher Yoder PC

(57) ABSTRACT

An example embodiment may involve providing for display a discovery schedule creation page for creating a discovery schedule. The embodiment may also involve, in response to receiving user input indicative of creation of a discovery schedule via the discovery schedule creation page, providing for display a discovery process page. Providing the discovery process page for display may involve, while the discovery process is being carried out according to the discovery schedule, dynamically updating the discovery process page to include total numbers of discovery results. The discovery process page may include selectable links for navigating to and displaying three pages: a discovered configuration items page, an error flow page, and a scheduling summary page.

20 Claims, 29 Drawing Sheets

Related U.S. Application Data

(60) Provisional application No. 62/567,055, filed on Oct. 2, 2017.

(51) Int. Cl.
*H04L 12/24* (2006.01)
*H04L 29/08* (2006.01)

(52) U.S. Cl.
CPC .............. *H04L 43/12* (2013.01); *H04L 67/16* (2013.01); *H04L 67/28* (2013.01); *H04L 41/0806* (2013.01); *H04L 41/5058* (2013.01)

(58) Field of Classification Search
USPC ........................................................ 370/254
See application file for complete search history.

(56) References Cited

U.S. PATENT DOCUMENTS

| | | |
|---|---|---|
| 6,321,229 B1 | 11/2001 | Goldman |
| 6,799,189 B2 | 9/2004 | Huxoll |
| 6,816,898 B1 | 11/2004 | Scarpelli |
| 6,895,586 B1 | 5/2005 | Brasher |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,877,783 B1 | 1/2011 | Cline |
| 7,933,927 B2 | 4/2011 | Dee |
| 7,941,506 B2 | 5/2011 | Bonal |
| 7,945,860 B2 | 5/2011 | Vambenepe |
| 8,082,222 B2 | 12/2011 | Rangarajan |
| 8,346,752 B2 | 1/2013 | Sirota |
| 8,380,645 B2 | 2/2013 | Kowalski |
| 8,554,750 B2 | 10/2013 | Rangaranjan |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,907,988 B2 | 12/2014 | Poston |
| 9,015,188 B2 | 4/2015 | Behne |
| 9,015,849 B1 | 4/2015 | Bezbaruah et al. |
| 9,037,536 B2 | 4/2015 | Vos |
| 9,137,115 B2 | 9/2015 | Mayfield |
| 9,261,372 B2 | 2/2016 | Clinet |
| 9,323,801 B2 | 4/2016 | Morozov |
| 9,412,084 B2 | 9/2016 | Kowalski |
| 9,467,344 B2 | 10/2016 | Gere |
| 9,534,903 B2 | 1/2017 | Cline |
| 9,613,070 B2 | 4/2017 | Kumar |
| 9,631,934 B2 | 4/2017 | Cline |
| 9,659,051 B2 | 5/2017 | Hutchins |
| 9,792,387 B2 | 10/2017 | George |
| 9,852,165 B2 | 12/2017 | Morozov |
| 9,967,162 B2 | 5/2018 | Spinelli |
| 10,002,203 B2 | 6/2018 | George |
| 10,158,677 B1 | 12/2018 | Dicorpo et al. |
| 2003/0009547 A1 | 1/2003 | Benfield et al. |
| 2005/0021723 A1* | 1/2005 | Saperia ................. H04L 41/022 709/223 |
| 2005/0083854 A1 | 4/2005 | Nagarajrao et al. |
| 2006/0080382 A1* | 4/2006 | Dutta .................. H04L 12/2803 709/203 |
| 2006/0092861 A1 | 5/2006 | Corday et al. |
| 2006/0168208 A1* | 7/2006 | Nagami .............. H04L 41/0893 709/224 |
| 2007/0208837 A1* | 9/2007 | Tian ....................... G06F 3/1226 709/223 |
| 2009/0210523 A1* | 8/2009 | Duggan .................. H04L 41/12 709/223 |
| 2009/0313362 A1 | 12/2009 | Duggan |
| 2010/0077286 A1* | 3/2010 | Guagenti ............... H04L 1/1867 715/205 |
| 2010/0235493 A1 | 9/2010 | Besaw et al. |
| 2011/0134797 A1* | 6/2011 | Banks ................. H04W 40/246 370/254 |
| 2011/0141913 A1 | 6/2011 | Clemens et al. |
| 2012/0226791 A1 | 9/2012 | Ramaswamy et al. |
| 2013/0132854 A1 | 5/2013 | Raleigh et al. |
| 2013/0276053 A1 | 10/2013 | Hugard, IV et al. |
| 2014/0189680 A1* | 7/2014 | Kripalani ................ G06F 30/20 717/176 |
| 2014/0317277 A1* | 10/2014 | Panozzo ............... H04L 41/022 709/224 |
| 2016/0182305 A1* | 6/2016 | Martin .................... G06F 21/33 726/10 |
| 2017/0093640 A1 | 3/2017 | Subramanian et al. |
| 2017/0310547 A1 | 10/2017 | Lin |
| 2018/0107920 A1 | 4/2018 | Jayaraman et al. |
| 2018/0287885 A1* | 10/2018 | Shakimov ............... H04L 41/22 |
| 2018/0309775 A1 | 10/2018 | Zou et al. |
| 2018/0322417 A1 | 11/2018 | Bendre et al. |

\* cited by examiner

FIG. 17

```
┌─────────────────────────────────────────────────────────────────────┐
│   PROVIDING FOR DISPLAY, ON A GRAPHICAL USER INTERFACE, A DISCOVERY SCHEDULE    │
│  CREATION PAGE FOR CREATING A DISCOVERY SCHEDULE, WHERE THE DISCOVERY SCHEDULE  │
│     CREATION PAGE INCLUDES SELECTABLE OPTIONS DEFINING WHEN TO CARRY OUT A      │
│   DISCOVERY PROCESS IN WHICH ONE OR MORE PROXY SERVERS ON A MANAGED NETWORK     │  ← 2700
│      DETERMINE AND PROVIDE TO A REMOTE NETWORK MANAGEMENT PLATFORM DISCOVERY    │
│    INFORMATION RELATING TO CONFIGURATION ITEMS OF THE MANAGED NETWORK, WHERE THE│
│      CONFIGURATION ITEMS INCLUDE ONE OR MORE OF COMPUTING DEVICES, SOFTWARE     │
│              APPLICATIONS, AND CONFIGURATIONAL RELATIONSHIPS THEREBETWEEN       │
└─────────────────────────────────────────────────────────────────────┘
                                    │
                                    ▼
┌─────────────────────────────────────────────────────────────────────┐
│    IN RESPONSE TO RECEIVING, BY WAY OF THE GRAPHICAL USER INTERFACE, USER INPUT │
│      INDICATIVE OF CREATION OF THE DISCOVERY SCHEDULE VIA THE DISCOVERY SCHEDULE│
│  CREATION PAGE, PROVIDING FOR DISPLAY, ON THE GRAPHICAL USER INTERFACE, A DISCOVERY│
│           PROCESS PAGE, WHERE PROVIDING THE DISCOVERY PROCESS PAGE INCLUDES:    │
│                                                                                 │
│     (I) WHILE THE DISCOVERY PROCESS IS BEING CARRIED OUT ACCORDING TO THE DISCOVERY│
│       SCHEDULE, DYNAMICALLY UPDATING THE DISCOVERY PROCESS PAGE TO INCLUDE TOTAL│
│        NUMBERS OF DISCOVERY RESULTS, THE DISCOVERY RESULTS INCLUDING (A) DISCOVERED│
│         CONFIGURATION ITEMS, (B) ERRORS RELATING TO THE DISCOVERY PROCESS, AND (C)│
│    UNIDENTIFIED NETWORK ADDRESSES ASSOCIATED WITH CONFIGURATION ITEMS THAT ARE NOT│
│                     INCLUDED IN THE DISCOVERED CONFIGURATION ITEMS, AND         │
│    (II) DISPLAYING, IN THE DISCOVERY PROCESS PAGE, A TOTAL NUMBER OF CREATED DISCOVERY│
│      SCHEDULES ACCORDING TO WHICH THE DISCOVERY PROCESS HAS BEEN OR IS BEING CARRIED│  ← 2702
│                                         OUT,                                    │
│                                                                                 │
│     WHERE THE DISCOVERED CONFIGURATION ITEMS AS DISPLAYED INCLUDE A FIRST SELECTABLE│
│      LINK FOR NAVIGATING TO AND DISPLAYING A DISCOVERED CONFIGURATION ITEMS PAGE THAT│
│         LISTS, FOR EACH OF A PLURALITY OF CONFIGURATION ITEM TYPES, A TOTAL NUMBER OF│
│                            DISCOVERED CONFIGURATION ITEMS,                      │
│                                                                                 │
│    WHERE THE ERRORS AS DISPLAYED INCLUDE A SECOND SELECTABLE LINK FOR NAVIGATING TO│
│       AND DISPLAYING AN ERROR FLOW PAGE THAT LISTS, FOR EACH OF A PLURALITY OF ERROR│
│     TYPES, A TOTAL NUMBER OF ERRORS RELATING TO THE DISCOVERY PROCESS, AND PROVIDES│
│        SELECTABLE LINKS FOR DISPLAYING INFORMATION INDICATING CAUSES FOR EACH OF THE│
│                                          ERRORS, AND                            │
│                                                                                 │
│       WHERE THE CREATED DISCOVERY SCHEDULES AS DISPLAYED INCLUDE A THIRD SELECTABLE│
│         LINK FOR NAVIGATING TO AND DISPLAYING A SCHEDULING SUMMARY PAGE THAT INCLUDES,│
│       FOR THE DISCOVERY SCHEDULE, TOTAL NUMBERS FOR CATEGORIES INCLUDING DISCOVERED│
│       CONFIGURATION ITEMS, ERRORS, AND UNIDENTIFIED NETWORK ADDRESSES, WHERE EACH OF│
│       THE CATEGORIES AS DISPLAYED IS SELECTABLE FOR TRIGGERING DISPLAY OF A TREND GRAPH│
│       IN THE SCHEDULING SUMMARY PAGE, THE TREND GRAPH INDICATING THE TOTAL NUMBERS FOR│
│           THE CATEGORY RESULTING FROM ONE OR MORE PAST OCCURRENCES OF THE DISCOVERY│
│       PROCESS ACCORDING TO THE DISCOVERY SCHEDULE, AND WHERE THE SCHEDULING SUMMARY│
│         PAGE FURTHER INCLUDES SELECTABLE OPTIONS FOR USING EACH OF THE CATEGORIES AS A│
│                          BASIS FOR SORTING THE DISCOVERY SCHEDULE.              │
└─────────────────────────────────────────────────────────────────────┘
```

FIG. 27

```
                                    ┌─────────────────────────────────────────┐
                                    │ PERFORMING, BY A COMPUTATIONAL INSTANCE OF A DISCOVERY SYSTEM
                                    │ OPERATING ON A REMOTE NETWORK MANAGEMENT PLATFORM, A DISCOVERY
                                    │ PROCESS, WHERE PERFORMING THE DISCOVERY PROCESS INCLUDES:
                                    │
                                    │ (I) INSTRUCTING ONE OR MORE PROXY SERVERS ON A MANAGED NETWORK TO
                                    │ DETERMINE AND PROVIDE, TO THE COMPUTATIONAL INSTANCE, DISCOVERY
                                    │ INFORMATION RELATING TO CONFIGURATION ITEMS OF THE MANAGED NETWORK,
                                    │ WHERE THE CONFIGURATION ITEMS INCLUDE ONE OR MORE OF COMPUTING        ← 2800
                                    │ DEVICES, SOFTWARE APPLICATIONS, AND CONFIGURATIONAL RELATIONSHIPS
                                    │ THEREBETWEEN, THE DISCOVERY INFORMATION INCLUDING IDENTIFICATIONS AND
                                    │ CLASSIFICATIONS OF THE CONFIGURATION ITEMS;
                                    │
                                    │ (II) RECEIVING THE DISCOVERY INFORMATION FROM THE ONE OR MORE PROXY
                                    │ SERVERS; AND
                                    │
                                    │ (III) BASED ON THE DISCOVERY INFORMATION, DETERMINING (A) THE
                                    │ CONFIGURATION ITEMS DISCOVERED DURING THE DISCOVERY PROCESS, (B)
                                    │ ERRORS RELATING TO THE DISCOVERY PROCESS, AND (C) UNIDENTIFIED
                                    │ NETWORK ADDRESSES ASSOCIATED WITH CONFIGURATION ITEMS THAT ARE NOT
                                    │ INCLUDED IN THE DISCOVERY INFORMATION
                                    └─────────────────────────────────────────┘
                                                         │
                                                         ▼
                                    ┌─────────────────────────────────────────┐
                                    │ DURING AND AFTER PERFORMING THE DISCOVERY PROCESS, PROVIDING FOR
                                    │ DISPLAY, BY THE COMPUTATIONAL INSTANCE, DYNAMIC UPDATES TO A
                                    │ GRAPHICAL USER INTERFACE THAT INCLUDES RESPECTIVE TOTAL NUMBERS OF
                                    │ THE CONFIGURATION ITEMS DISCOVERED DURING THE DISCOVERY PROCESS, THE  ← 2802
                                    │ ERRORS, AND THE UNIDENTIFIED NETWORK ADDRESSES, WHERE THE GRAPHICAL
                                    │ USER INTERFACE FURTHER INCLUDES A TOTAL NUMBER OF DEFINED SCHEDULES
                                    │ ACCORDING TO WHICH THE DISCOVERY PROCESS HAS BEEN OR IS BEING
                                    │ CARRIED OUT
                                    └─────────────────────────────────────────┘
```

FIG. 28

OPERATION OF DEVICE AND APPLICATION DISCOVERY FOR A MANAGED NETWORK

CROSS REFERENCE TO RELATED APPLICATION

The present application is a continuation of U.S. patent application Ser. No. 15/815,436, filed on Nov. 16, 2017, which claims priority to U.S. Provisional Patent Application No. 62/567,055, filed on Oct. 2, 2017, both of which are entitled "Improvements to Operation of Device and Application Discovery for a Managed Network," the entire contents of which are herein incorporated by reference.

BACKGROUND

Remote network management platforms allow computer networks to be managed by way of cloud-based devices and services. Advantageously, these architectures simplify the provisioning and operation of managed networks, including computing devices, software applications, and configurational relationships therebetween present in such managed networks. However, operation of managed networks may be a time-consuming and technically-complex process. For instance, this operation may involve acquisition and storage of a large quantity and variety of information associated with the managed networks, which may be particularly complex if the managed networks have numerous devices, applications, etc., and/or if potential or existing errors with one or more devices, applications, etc. in the managed networks are to be diagnosed.

SUMMARY

In the context of a managed network, each device, software application and the configurational relationships therebetween may be referred to as a configuration item, and the process of determining configuration items within the managed network may be referred to as discovery. In line with the discussion above, discovery may involve, in part, setting up proxy servers that are configured to detect configuration items in the managed network, defining the scope and schedule for discovery, and reviewing discovery results. Due to the complex nature of discovery, these and/or other aspects may at times become difficult to undertake, which may in some scenarios cause undesirable issues to arise.

The embodiments herein provide methods, systems, and user interfaces for streamlining discovery and its various aspects. In particular, such methods, systems, and interfaces may enable a user to efficiently set up server(s) for discovery, define the scope and schedule for discovery in a manner that facilitates desired, substantive results, review discovery results, and use the results to identify trends, errors, and other useful information.

Accordingly, a first example embodiment may involve providing for display, on a graphical user interface, a discovery schedule creation page for creating a discovery schedule, where the discovery schedule creation page includes selectable options defining when to carry out a discovery process in which one or more proxy servers on a managed network determine and provide to a remote network management platform discovery information relating to configuration items of the managed network, where the configuration items include one or more of computing devices, software applications, and configurational relationships therebetween. The first example embodiment may also involve, in response to receiving, by way of the graphical user interface, user input indicative of creation of the discovery schedule via the discovery schedule creation page, providing for display, on the graphical user interface, a discovery process page.

Providing the discovery process page for display may involve, while the discovery process is being carried out according to the discovery schedule, dynamically updating the discovery process page to include total numbers of discovery results, the discovery results including (a) discovered configuration items, (b) errors relating to the discovery process, and (c) unidentified network addresses associated with configuration items that are not included in the discovered configuration items. Providing the discovery process page for display may also involve displaying, in the discovery process page, a total number of created discovery schedules according to which the discovery process has been or is being carried out.

The discovered configuration items as displayed may include a first selectable link for navigating to and displaying a discovered configuration items page that lists, for each of a plurality of configuration item types, a total number of discovered configuration items. In addition, the errors as displayed may include a second selectable link for navigating to and displaying an error flow page that lists, for each of a plurality of error types, a total number of errors relating to the discovery process, and provides selectable links for displaying information indicating causes for each of the errors. Further, the created discovery schedules as displayed may include a third selectable link for navigating to and displaying a scheduling summary page that includes, for the discovery schedule, total numbers for categories including discovered configuration items, errors, and unidentified network addresses, where each of the categories as displayed is selectable for triggering display of a trend graph in the scheduling summary page, the trend graph indicating the total numbers for the category resulting from one or more past occurrences of the discovery process according to the discovery schedule, and where the scheduling summary page further includes selectable options for using each of the categories as a basis for sorting the discovery schedule.

A second example embodiment may involve performing, by a computational instance of a discovery system operating on a remote network management platform, a discovery process. Performing the discovery process may involve instructing one or more proxy servers on a managed network to determine and provide, to the computational instance, discovery information relating to configuration items of the managed network, where the configuration items include one or more of computing devices, software applications, and configurational relationships therebetween, the discovery information including identifications and classifications of the configuration items. Performing the discovery process may also involve receiving the discovery information from the one or more proxy servers. And performing the discovery process may also involve, based on the discovery information, determining (a) the configuration items discovered during the discovery process, (b) errors relating to the discovery process, and (c) unidentified network addresses associated with configuration items that are not included in the discovery information. The second example embodiment may also involve, during and after performing the discovery process, providing for display, by the computational instance, dynamic updates to a graphical user interface that includes respective total numbers of the configuration items discovered during the discovery process, the errors, and the unidentified network addresses, where the graphical user interface further includes a total number of defined schedules according to which the discovery process has been or is being carried out.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 17 illustrates an example GUI, in accordance with example embodiments.

FIG. 27 is a flow chart, in accordance with example embodiments.

FIG. 28 is a flow chart, in accordance with example embodiments.

DETAILED DESCRIPTION

Figure 1:
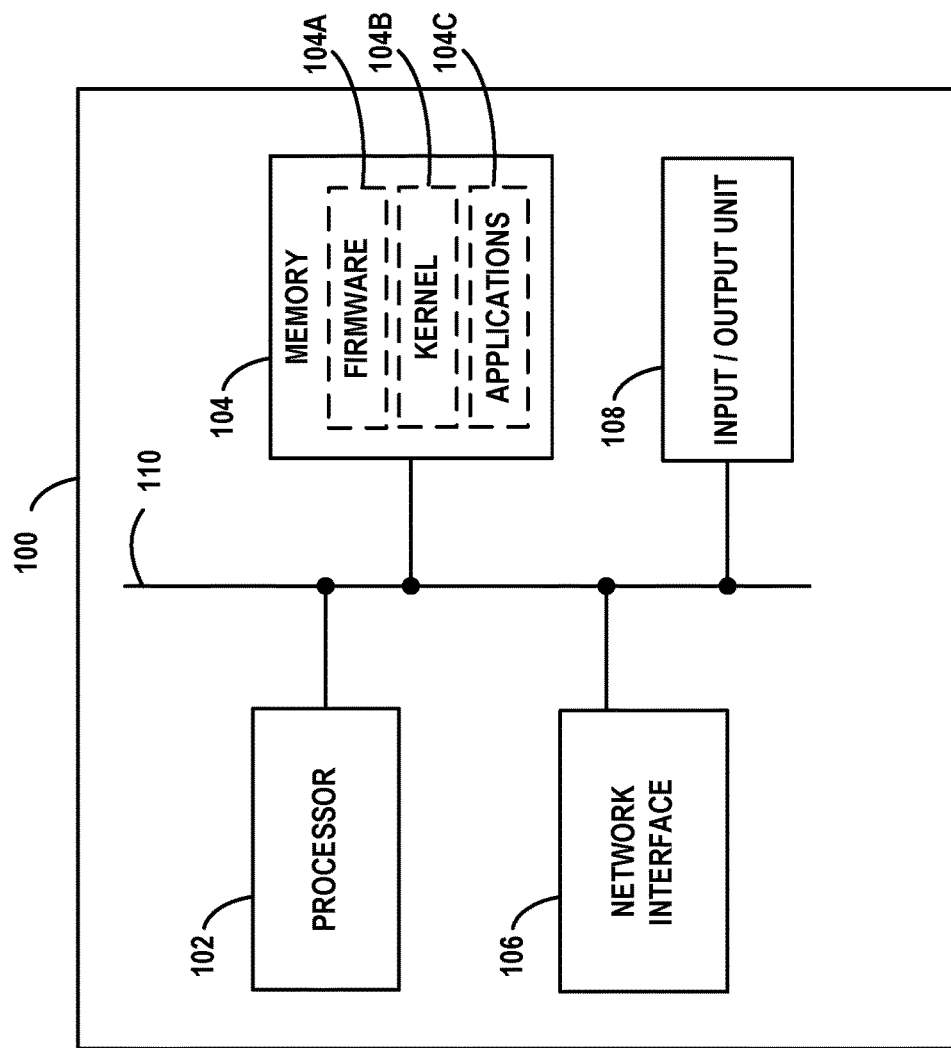
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
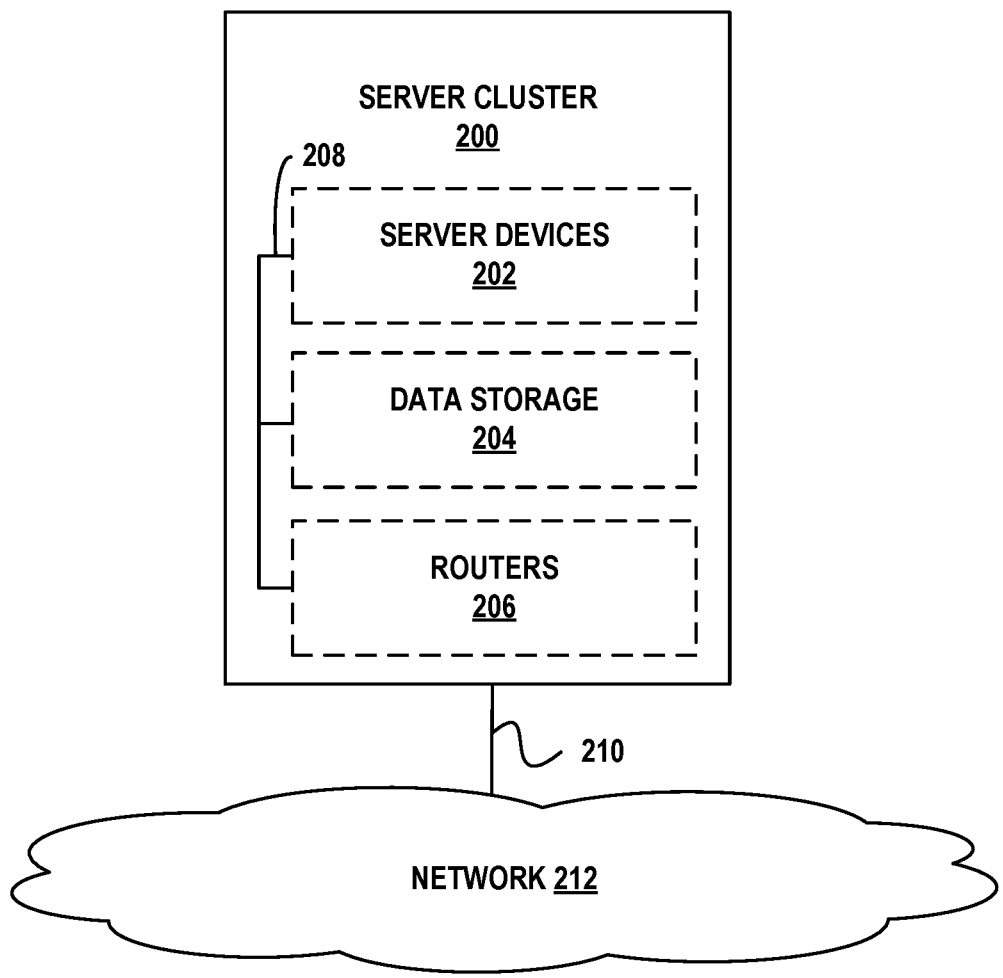
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid-state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. Example Remote Network Management Architecture

Figure 3:
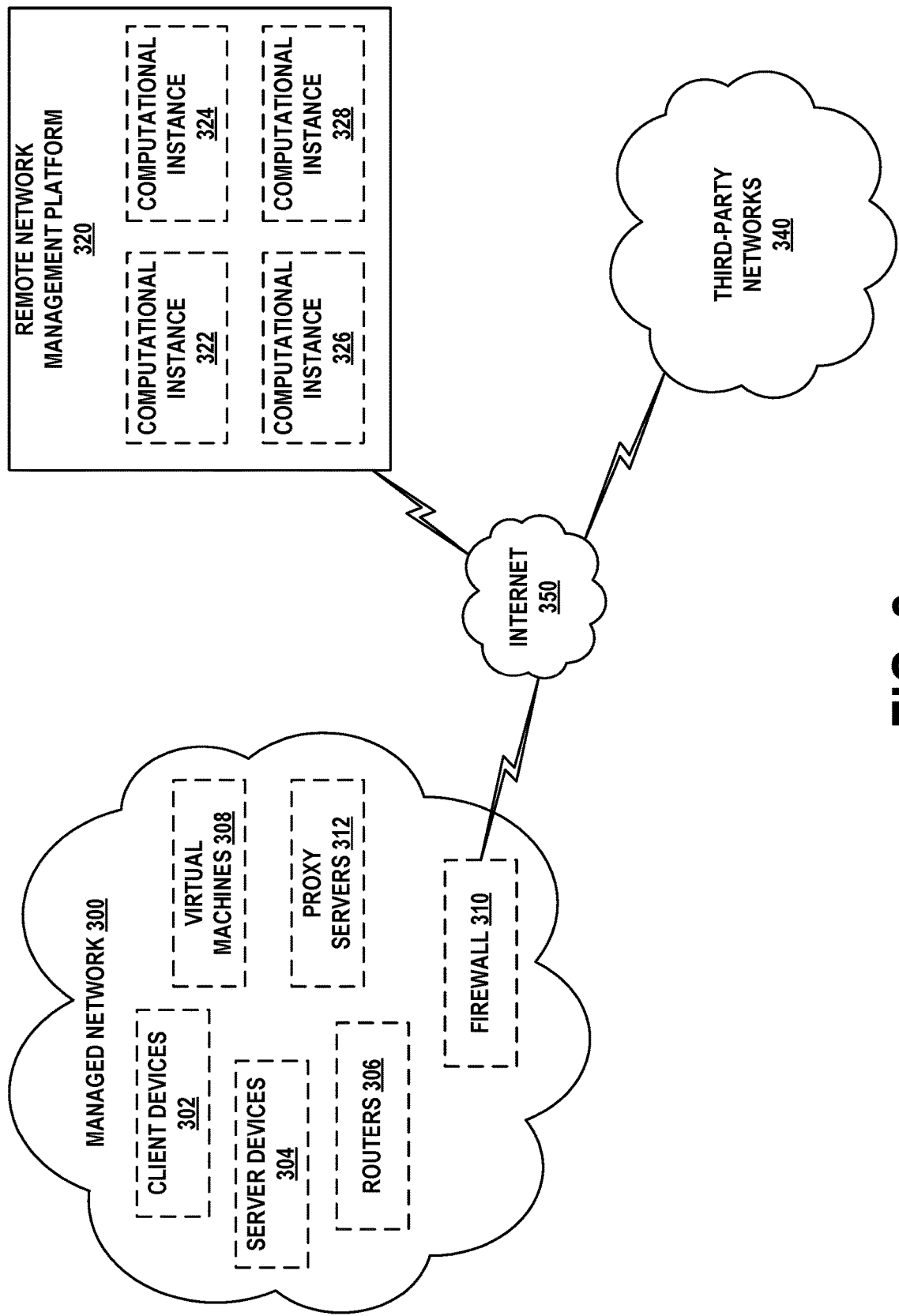
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
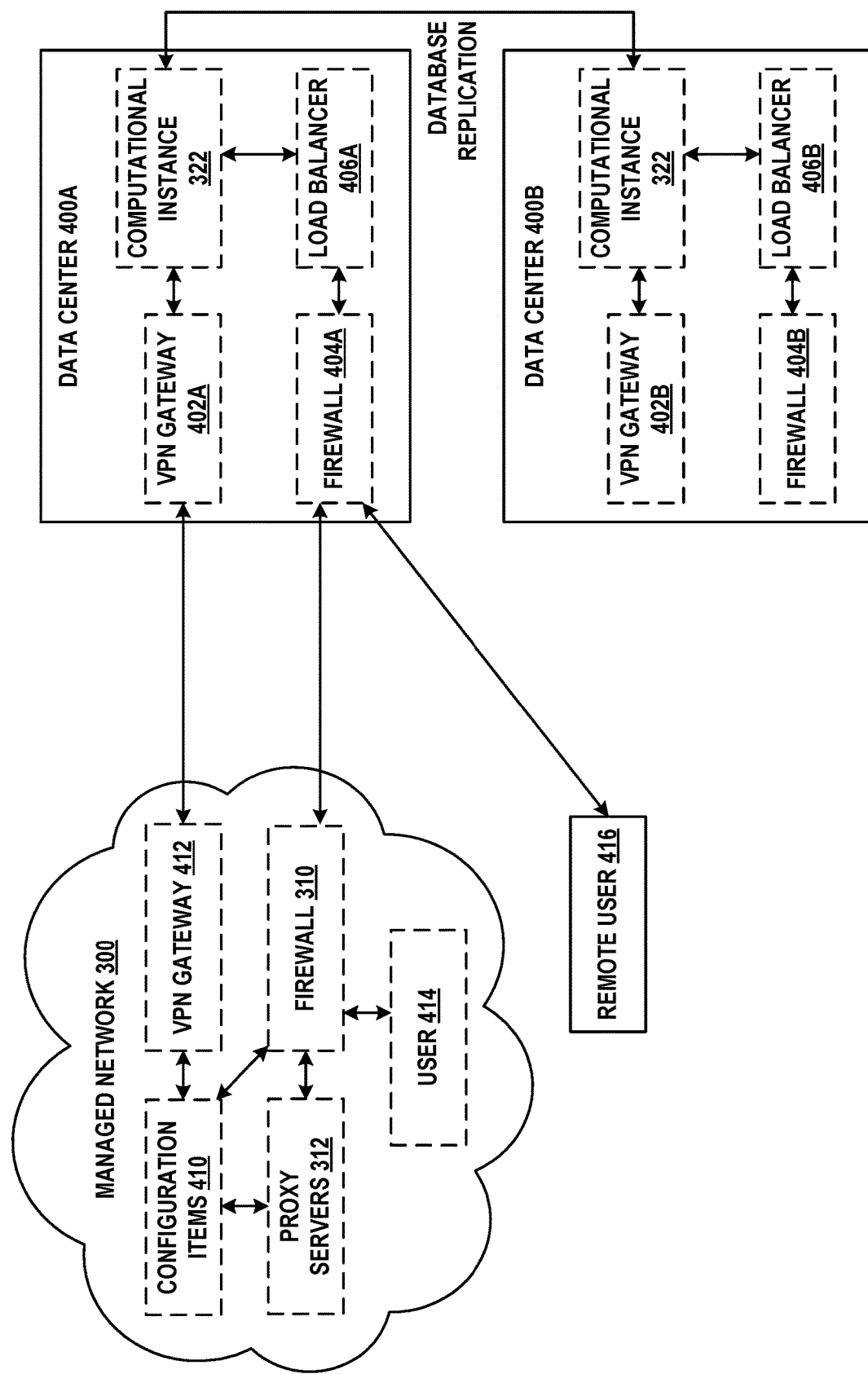
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
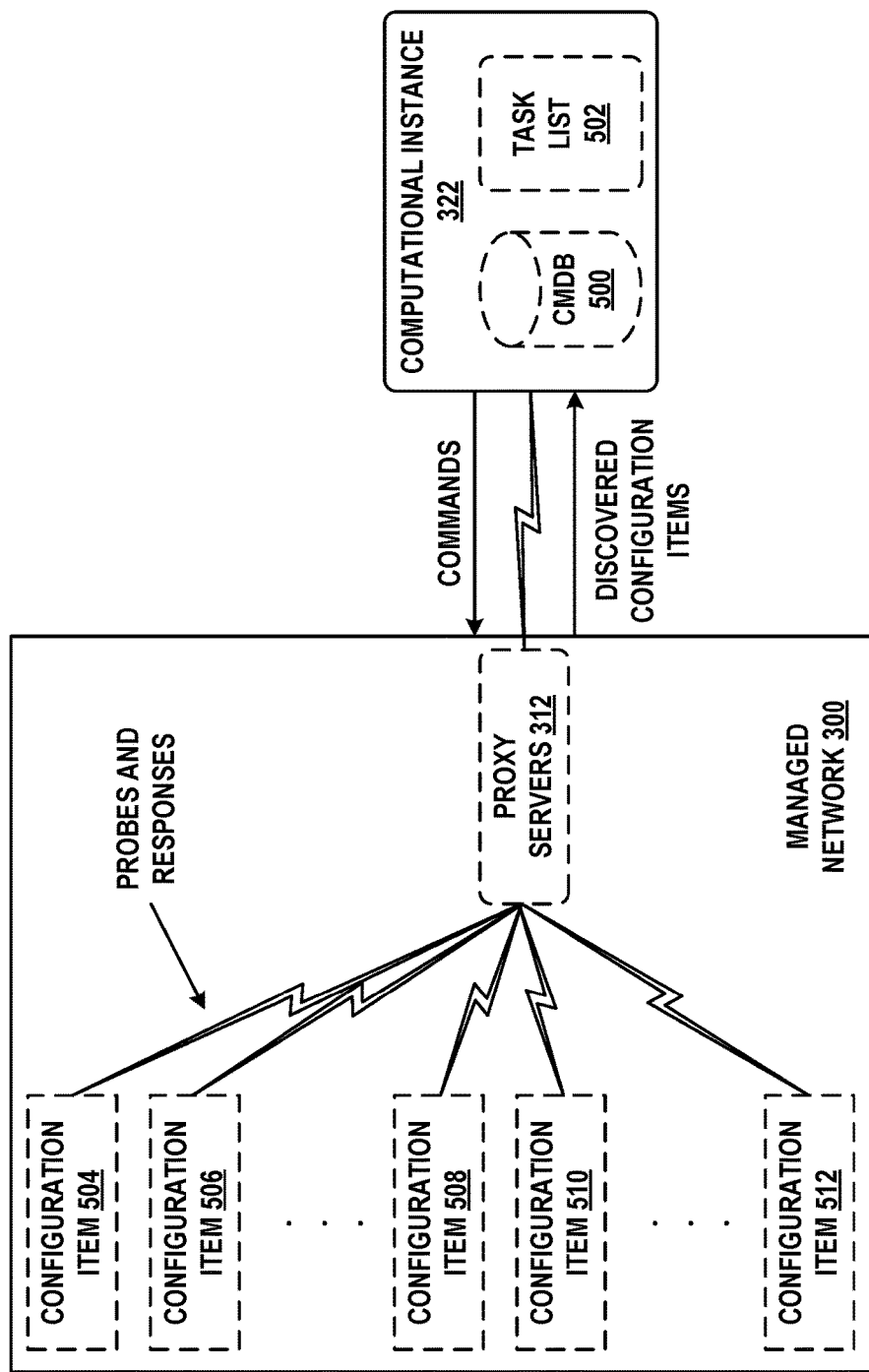
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

In line with the discussion above, a proxy server may be configured to facilitate communication and movement of data between remote network management platform 320 and external applications, data sources, and services. The proxy server may perform various tasks, including but not limited to (i) communicating securely with a computational instance (e.g., computational instance 322) to determine which discovery probes to transmit, (ii) transmitting discovery probes on a local network (e.g., managed network 300) to gather the information regarding discovered configuration items, and (iii) transmitting discovery probe results back to the computational instance (e.g., to CMDB 500) for storage therein, and perhaps for further processing. A proxy server may take various forms, such as a Java application that runs as a UNIX® daemon or a WINDOWS® service.

In some embodiments, proxy server communications with computational instances may be initiated inside the enterprise's firewall (e.g., firewall 310) and may thus occur without firewall rules or VPNs.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
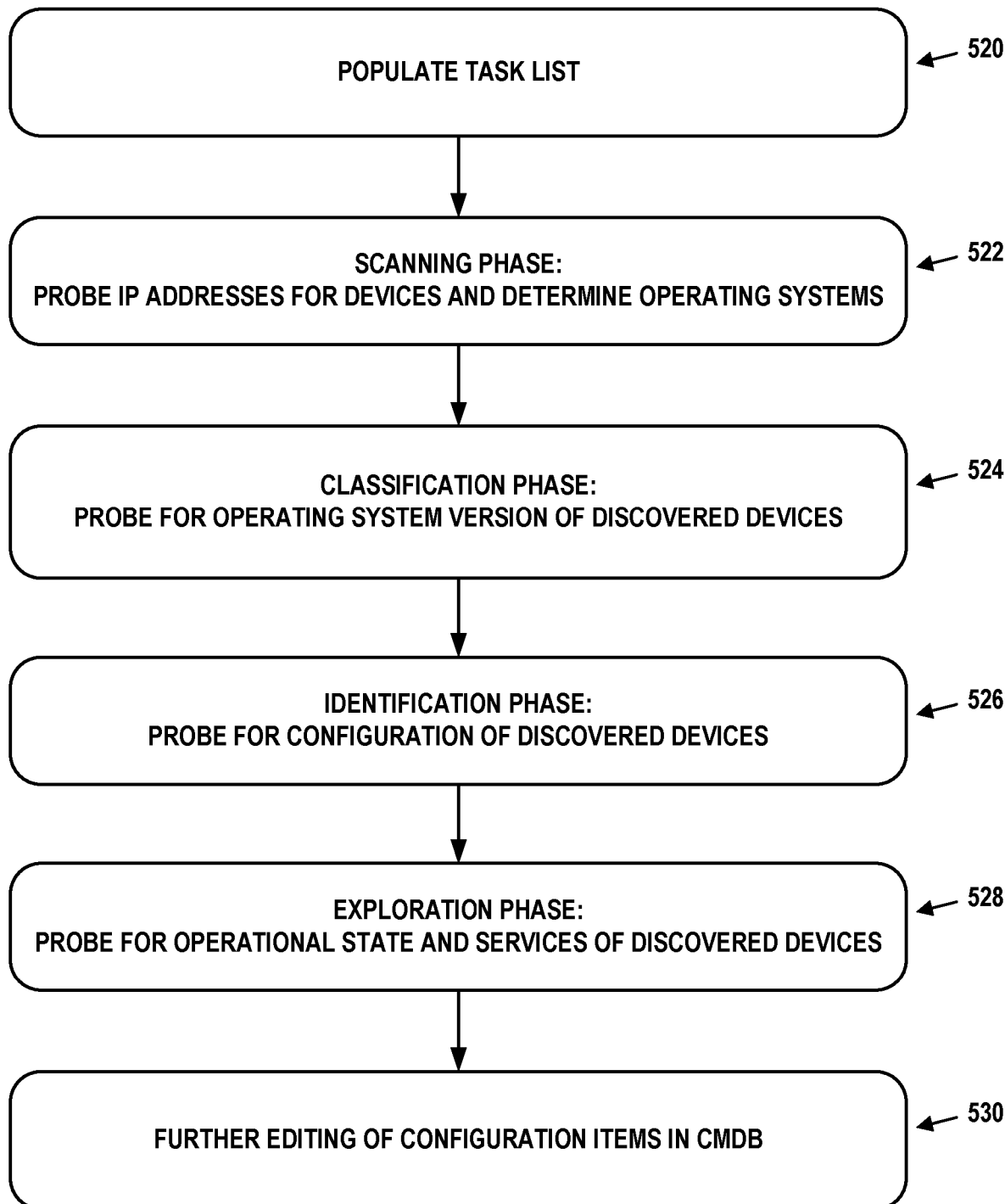
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. Example Discovery Operation

In line with the discussion above, due to the complex nature of discovery, there may be scenarios in which users (usually those with administrator roles) may find aspects of the discovery procedure to be difficult to manage, regardless of those users' technical expertise. For example, it may be difficult to set up the devices that facilitate discovery, to schedule when discovery will occur, and begin the discovery process. Additionally or alternatively, during or after completion of discovery, the status and/or results of discovery may include a large variety of information that is difficult to view, navigate, or clearly understand, which may be especially problematic in scenarios where discovery has identified operational errors or other types of errors with discovered configuration items, or even errors with the discovery process itself.

Accordingly, the present disclosure provides a discovery system that streamlines discovery for administrators and other possible users. Such a discovery system may enable users to efficiently configure various aspects of discovery, such as setting up proxy servers, scheduling when discovery will be carried out, carrying out discovery, and providing collected information. Further, the discovery system may provide the collected information in a useful, organized manner so that a user can efficiently and quickly navigate through the information, which may in turn facilitate a clear understanding of discovery status and results, including errors identified therein. For example, the discovery system may accumulate discovery information over time (e.g., over a few weeks or a month) and organize this information in a way that enables a user to identify trends (e.g., devices that experience frequent operational errors). In addition, while discovery information might otherwise typically be accumulated and stored in CMDB 500 with little or no organization, the discovery system may monitor and present this information in a streamlined, organized manner to better facilitate operation of past, present, and future discovery in the managed network.

Furthermore, the discovery system may be configured to manage discovery with various degrees of automation. For instance, a discovery administrator may choose to have discovery occur automatically at scheduled times that the discovery system itself determines rather than the administrator. Alternatively, the administrator may choose when discovery should occur, and then give permissions for the discovery system to carry out discovery at the chosen time(s). And alternatively, the administrator may manually initiate discovery whenever he/she chooses.

These and other improvements are described in more detail below, though it should be understood that the operations described below are for purposes of example. Systems relating to discovery operation may provide other improvements as well.

In some embodiments, the discovery system described herein may take the form of a software application installed on remote network management platform 320. Through this software application, a user of remote network management platform 320 may be able to manage discovery of managed network 300 and its components. Accordingly, for the purposes of discussion, computational instance 322 may represent this software application, and thus, the terms "discovery system" and "computational instance 322" may be used interchangeably to refer to the discovery system of the present disclosure. It should be understood, however, that such a discovery system could take other forms.

The following description makes reference to a variety of GUIs (or "pages" displayed on GUIs) that the discovery system may provide to facilitate various operations relating to discovery operation. In particular, and in accordance with the present disclosure, two or more GUIs may be arranged to provide a workflow for preparing for, scheduling, and/or reviewing results of discovery. As such, multiple GUIs may have predefined relationships to one another, such that any given GUI may include links to one or more other GUIs. For example, multiple GUIs may have a predefined sequential order, and thus the discovery system may provide the GUIs in the predefined sequential order. As another example, multiple GUIs may be arranged in a predefined tree structure, and thus the discovery system may provide the GUIs in accordance with the predefined tree structure. Other arrangements of GUIs are possible as well. In any event, the discovery system may be configured to provide the GUIs in accordance with the predefined relationships between the GUIs.

Furthermore, the arrangement of information within each GUI may vary from embodiment to embodiment. In some embodiments, a GUI may be defined such that particular types of information may be provided at particular portions of the GUI. In other embodiments, a GUI may allow for dynamic population of information to various portions of the GUI based on the types and/or quantities of information to be provided. Further, although discovery information may be described herein as included/displayed as part of multiple related GUIs (e.g., multiple linked GUIs), such information could additionally or alternatively be included/displayed in a single GUI, such as a single GUI where not all information is at first displayed, but where additional information may be displayed in the GUI once the user selects a link, enters a command, etc.

In some embodiments, the discovery system may be configured to first provide a mechanism for streamlining the setup of at least one proxy server in managed network 300 before enabling discovery. Discovery operation may be divided into at least two phases. For example, discovery operation may involve a proxy server setup phase and a discovery phase.

While the discovery operations discussed below are described primarily with respect to a single proxy server, it should be understood that, proxy server setup and discovery setup operations may be performed with respect to multiple proxy servers, either one proxy server at a time (e.g., scheduling discovery at different times for different proxy servers) or in bulk (e.g., scheduling discovery for a group of proxy servers to occur at the same time). In practice, there may be a variety of different proxy servers, each assigned with a respective IP range, and each configured to discover devices in that IP range.

The process for setting up a proxy server may involve various tasks. Representative examples of these tasks are described below, but it should be understood that other tasks are possible as well, additionally or alternatively to those described herein.

In some embodiments, tasks for setting up a proxy server may involve (i) creating a proxy server user account that allows authentication with computational instance 322 on remote network management platform 320, (ii) downloading a proxy server installation package, (iii) installing the proxy server in managed network 300, (iv) validating the proxy server, (v) adding SNMP credentials to enable the proxy server to communicate with other systems in managed network 300 and determine which subnet(s) the proxy server may have access to, and/or (vi) auto-assigning an IP address range to the proxy server.

In some embodiments, creating a proxy user account may involve the discovery system providing a GUI for the user to create a separate user account for each of multiple proxy servers, or alternatively to share the same account across multiple proxy servers.

The proxy server may be downloaded and installed in various ways. For example, the discovery system may provide a GUI including a menu through which the user may select a proxy server installation package to download. Execution of the proxy server installation package may then automate or partially automate the installation of the proxy server on a computing system in managed network 300. The proxy server may be installable on various types of computing systems in managed network 300, including but not limited to LINUX® computing systems and WINDOWS® computing systems. Further, in some embodiments, multiple proxy servers may be installable on the same computing system. Additionally or alternatively, the system may enable manual proxy server installation on a WINDOWS® service.

When a new proxy server has been installed and launched for the first time, it might not be able to execute fully-automated or partially-automated tasks until it is validated. For instance, the proxy server may be configured to disable setup of various credentials (e.g., credentials for the proxy server to access various other devices in managed network 300) and/or disable transmission of discovery probes until validation is complete. The discovery system may be configured to support various operations for validating the proxy server. For example, the discovery system may provide a GUI through which the user may select to confirm and/or evaluate network connectivity between computational instance 322 and the computing system on which the proxy server has been installed, such as by pinging the URL of computational instance 322 or by another method. Network connectivity results may then be provided to the user, such as in the form of a hop count and/or latency measurement. In addition, the discovery system may provide a GUI through which the user may view all proxy servers that are connected to computational instance 322 and manually select which ones to validate.

Furthermore, the process of setting up the proxy server may involve the proxy server being provided, either manually by the user or automatically by the discovery system, with SNMP credentials to enable the proxy server to communicate with other systems in managed network 300 using SNMP protocol. These and/or other types of credentials (e.g., WINDOWS® SSH) may be set up during the proxy server setup phase, during the discovery phase, and/or at another time.

Moreover, upon completion of one or more of the steps discussed above, the discovery system may automatically assign an IP address range to the proxy server as a subnet. Then, as noted above, computational instance 322 may store this information in CMDB 500 and place tasks in task list 502 for discovery of configuration items at each of the IP addresses. At this stage or later, the discovery system may be configured to automatically, or upon receipt of user instruction, evaluate network connectivity with one or more of the configuration items, such as by determining and then providing for display a hop count and/or latency measurement. This may enable the user to determine if the proxy server is suitable for reaching one or more configuration items of the subnet, such as by comparing the proxy server's connectivity results to that of other proxy servers to determine which proxy server is most suitable for reaching the subnet.

In some embodiments, the discovery system may be configured to disable operations related to discovery setup until the number of set up (e.g., validated and successfully assigned with a range of IP addresses) proxy servers meets or exceeds a predefined threshold. In some examples, this threshold may be one proxy server. In other examples, this threshold may be at least two proxy servers.

After at least one proxy server is set up, the discovery setup phase may begin, and the discovery system may provide a mechanism (e.g., GUIs) for the user to configure discovery. Configuration of discovery may involve various tasks, including determining when to schedule discovery to run on the IP addresses assigned to the proxy server(s) and/or one or more of the phases described above (e.g., scanning, classification, identification). These and other example tasks related to configuring discovery are described in more detail below. It should be noted, however, that other discovery configuration tasks are possible as well, additionally or alternatively to those described herein.

In some embodiments, configuring discovery may involve selecting the types of configuration items to discover. To facilitate this, the discovery system may provide a GUI through which the user may specify with varying granularity which configuration items to collect data for (and thereby populate CMDB 500 with) and which configuration items to ignore and thus exclude from the CMDB 500. For example, the GUI may enable the user to select whether to discover high-level types of configuration items such as network devices (e.g., IP router, IP firewall printer, desktop computer, laptop computer, tablet computer, out-of-band device, IP switching device), storage devices, UNIX® servers and computers, WINDOWS® servers and computers, automation applications, database applications, and/or web and application servers, among other possible configuration items. Under one or more high-level types, the GUI may also enable the user to select whether to discover certain configuration items at a more granular level. For instance, under the high-level type of WINDOWS® servers and computers, the GUI may enable the user to select whether to discover WINDOWS® 2000 servers and/or computers, WINDOWS® 2003 servers and/or computers, WINDOWS® clusters, and WINDOWS® OS and system information, among other possibilities. Other forms of more-granular configuration items are possible as well.

The GUI may also enable the user to filter whether to include or exclude UNIX® and/or WINDOWS® software in the discovery. In some embodiments, if the discovery system receives a selection to exclude a configuration item from CMDB 500, the discovery system may responsively disable the probe(s) that is/are used to discover that particular configuration item, but other probes used in the discovery phases might not be affected.

In addition, selecting which configuration items to discover may involve selecting at least one subnet to discover the selected configuration items. The discovery system may provide the user with a GUI that includes a list of proxy servers that have been set up, as well as a list of which configuration item(s) are in each proxy server's subnet. Thus, based on the determination of which configuration items to discover, the user may use the GUI to select the appropriate subnet(s) that can reach those configuration items. In line with the discussion above, configuration items may be listed and selected with varying granularity, such as by a high-level type (e.g., network devices, storage devices) or a lower-level type (e.g., routers, desktop computers). Further, if there are no proxy servers that can reach the subnet(s) that the user desires, the discovery system may responsively prompt the user to configure the proxy server (s) to facilitate discovery of configuration items in the desired subnet, such as by configuring the proxy server(s) with new credentials.

In line with the discussion above, in order for discovery to take place, a proxy server may be configured with credentials to log on to or otherwise access configuration items in managed network 300 that the proxy server may discover. Accordingly, configuring discovery may involve configuring the proxy server with credentials for each type of configuration item. These credentials may take various forms, including any one or more of the forms discussed above. The discovery system may provide a GUI for logging onto the proxy server using the proxy server user account and then configuring these credentials. Once these credentials are configured, the proxy server may be able communicate with each configuration item in managed network 300 for which the proxy server has corresponding credentials.

In some embodiments, the discovery system may be configured to carry out discovery without credentials. In these embodiments, the discovery system may enable the user to skip the credentials task for discovery configuration or otherwise define an option to perform discovery without credentials. As such, discovery may be limited to configuration items that do not require credentials.

In some embodiments, configuring discovery may involve making a determination of when discovery should run on the IP address ranges assigned to the proxy server. This determination may be performed manually by the user, semi-automatically (e.g., the user providing preferences as inputs and the discovery system generating schedules in response), or automatically by the discovery system. Some embodiments of the discovery system may limit discovery schedules to one schedule per subnet, though other embodiments may allow for multiple different schedules per subnet.

In some embodiments, the discovery system may provide a user with a GUI to enable the user to define the discovery schedule. Such a GUI may be designed to avoid the appearance of complexity and instead be quick and easy to navigate and understand, thereby allowing for streamlined schedule creation that fits the user's goals. Further, such a GUI may include elements with which a user may view or interact in performing some or all of the following operations.

The discovery system may be configured to carry out discovery according to different forms of discovery schedules. By way of example, the discovery schedule may be defined to run "anytime," on weekends, weekly, and during daily, off-peak times. Other examples, as well as variations on these examples, are possible as well.

When discovery is defined to run "anytime," there may be little-to-no limit on when discovery runs. For instance, the discovery system may itself determine when to run discovery, such as when new IP address ranges are assigned to the proxy server, when a user has changed which configuration items to include/exclude in discovery, or perhaps in a random manner. In some embodiments, however, this "anytime" form of discovery may trigger the discovery system to prompt the user to define a frequency window (e.g., daily or weekly), a start date/time for discovery to begin, and/or an end date/time for discovery to end. Further, the discovery system may be configured such that, if the frequency window is weekly, the maximum run time for discovery may be one week from the specified start time. Still further, the discovery system may be configured such that, if the frequency window is daily, the maximum run time for discovery may be one day from the specified start time.

When discovery is defined to run on weekends, the discovery system may run discovery for up to a predefined maximum amount of time on Friday, Saturday, and/or Sunday, and may begin discovery at a random time, a default time, or a user-specified time. For example, discovery may last a maximum of 48 hours and may begin by default on Saturday at 12:00 am. Other examples are also possible. Further, the discovery system may be configured to run discovery in this manner on a weekly basis (e.g., for up to 48 hours each weekend), bi-weekly basis (e.g., for up to 48 hours every two weeks), or on some other basis. The discovery system may enable the user to select one of these bases, or may be configured to select one automatically.

When discovery is defined to run weekly, the discovery system may run discovery on the same day each week. Accordingly, the discovery system may either automatically define, or provide a GUI or other mechanism to enable the user to define: (i) which day of the week to run discovery, (ii) the start time for discovery to begin on that day, and perhaps additionally (iii) the end time for discovery to end on that day. In some embodiments, if an end time is not defined, the discovery system may by default either run for 24 hours or until all configuration items in the subnet(s) have been discovered. In other embodiments, if a start time is not defined, the discovery system may be default begin running at a predefined time, such as 12:00 am or 9:00 am.

When discovery is defined to run during daily, off-peak times, the discovery system may run on a daily basis during off-peak hours. Such an option may be desirable in various scenarios, such as when discovery is urgent but there might not be enough time or resources available to run discovery for an entire day, and/or when discovery might disrupt devices during typical "peak" hours. What constitutes "off-peak" hours may vary from enterprise to enterprise. For instance, one enterprise may have off-peak hours from 5:00 pm one day until 9:00 am the next day. Another enterprise may have off-peak hours from 9:00 pm one day until 8:00 am the next day. In any event, the discovery system may automatically define or allow for the user to define when discovery should run. By way of example, the discovery system may automatically define, or provide a GUI or other mechanism to enable the user to define: (i) a start time for discovery to begin every day (e.g., begin running discovery at 5:00 pm every day) and/or (ii) a runtime for how long discovery can run (e.g., until 9:00 am the next day, until just before midnight of the same day, and/or until all selected configuration items have been discovered).

In any of the embodiments described above, the user may have authorization to configure default definitions of when the discovery system might, by default, schedule discovery to occur. Furthermore, in any of the embodiments described above, the discovery system may additionally provide a selectable option to automatically update the discovery schedule for the proxy server when new IP address ranges are discovered (e.g., manually, or by probing routers using SNMP).

In some embodiments, a single discovery schedule may be applied to a group of validated proxy servers, and in turn, may facilitate discovery of all configuration items within the range of IP addresses assigned to each such proxy server in the group. However, in other embodiments, a single discovery schedule could be applied to a single proxy server. Furthermore, in some embodiments, a discovery schedule may be limited to a maximum number of IP addresses, such as 100,000 IP addresses. The discovery system may be configured to determine the maximum number of IP addresses based on the total number of proxy servers and total number of IP addresses in the IP address ranges assigned to those proxy servers.

Moreover, in some embodiments, the discovery system may be configured to allow for only one created discovery schedule to operate at a time with respect to a given proxy server or group of proxy servers. For instance, if the user has a daily off-peak schedule in place and attempts to create a schedule that will carry out discovery on weekends only, the discovery system may be configured to (i) provide a GUI notifying the user that a schedule has already been created, such as by providing a GUI element that includes a warning message, perhaps with a link to the existing schedule, and/or (ii) provide a GUI that includes a prompt for the user to confirm that, by creating a new schedule, the existing schedule will be deleted.

In response to at least one discovery schedule is created (e.g., multiple discovery schedules, each associated with a respective set of one or more of proxy servers), the discovery system may automatically provide for display, or may enable the user to manually navigate to, a discovery manager homepage GUI. The homepage GUI may include various discovery metrics, such as the running number totals for a variety of discovery results categories, including but not limited to: (i) discovered configuration items, (ii) errors relating to discovery (e.g., errors that were discovered while carrying out discovery), and (iii) unidentified IP addresses associated with configuration items that are not included in the discovered configuration items. The homepage GUI may also include a total number of discovery schedules that have been created and according to which discovery has been carried out and/or is currently being carried out. In scenarios where discovery is currently being carried out according to at least one schedule is being carried out, the discovery system may be configured to dynamically update (e.g., refresh) the homepage GUI while discovery is being carried out according to the schedule(s) in order to show running number totals for each of the discovery results categories. And in scenarios where discovery is not currently being carried out, the discovery system may be configured to provide on the homepage GUI a total number for each of the discovery results categories, thereby summarizing the results of the discovery that has been completed according to the created schedule(s). The homepage GUI (or any other GUI discussed herein) may include other types of discovery metrics as well.

Herein, the terms "number totals" or "total number" may refer to running number totals that appear on a GUI while discovery is being carried out according to at least one schedule, as well as to number totals appearing on a GUI at a time where discovery is not being carried out. In scenarios where one or more schedules are running, for instance, some number totals may dynamically change on a GUI while the schedule(s) runs, whereas other number totals may not, depending on whether the results of the schedule(s) affect certain number totals. Furthermore, the GUI may include various types of visual representations of the number totals. For instance, the GUI may provide text, a bar graph, a line graph, a pie chart, and/or other representations.

Further, the homepage GUI may include selectable links to respective GUIs associated with one or more of the discovery categories and/or other discovery information (e.g., created schedules). In some embodiments, for instance, if the user selects a link associated with the discovered configuration items, the discovery system may provide a discovered configuration items GUI that enables the user to flexibly sort and view information related to discovered configuration items, and therefore enable the user to more efficiently access desired configuration item information. In particular, the discovered configuration items GUI may enable the user to select a given discovered configuration item and view various information associated with the configuration item. Such information may include, for the configuration item, (i) a name, (ii) a manufacturer, (iii) a location (e.g., in a managed network in Seattle), (iv) a class (e.g., a WINDOWS® server), (v) the last time the configuration item was updated (e.g., the last time its software was updated), (vi) a status for the configuration item (e.g., installed, uninstalled), (vii) an IP address for the configuration item, (viii) an operational status (e.g., operational, nonoperational), (ix) the date the configuration item was created/installed/etc., (x) the time the configuration item was most-recently discovered, and/or (xi) the configuration item's subnet, among other possibilities.

Further, the discovered configuration items GUI may also enable the user to sort the configuration items with varying granularity, such as by type (e.g., network devices, storage devices) or by any other criteria (e.g., name, status, manufacturer, subnet). Still further, the GUI may enable the user to view number totals for each of the four discovery results categories with respect to any configuration item criteria. For instance, for a given type of configuration item, the GUI may provide a total number of discovered configuration items, errors, unidentified IP addresses, targeted IP addresses, and/or schedules associated therewith. Yet further, the GUI may provide number totals per type of configuration item. For instance, the GUI may include a region with a bar graph or other visual representation of a total number of each type of configuration item. The discovered configuration items GUI may include other information as well, additionally or alternatively to the information discussed above.

In some embodiments, if the user selects a link associated with the discovery errors, the discovery system may provide an error flow GUI that may help the user track, diagnose, and resolve errors, including recurring errors. The error flow GUI may include a variety of information relating to errors that were detected during discovery. To facilitate this, during and after discovery is being carried out according to one or more schedules, the discovery system may compile, store in a memory, and display, in the errors GUI, a table or other representation of the errors. In particular, the GUI may sort the errors by category (or type), and perhaps additionally by sub-category. Examples of such error categories may include (i) configuration errors, (ii) internal errors, (iii) credentials errors, (iv) performance errors, (v) CMDB errors, and/or (vi) customization errors, among other possibilities. Configuration errors may include conditions encountered where a discovery or proxy server setting, parameter, or property was incorrect and that may need to be corrected in order for the discovery to complete correctly. Internal errors may include errors thrown by the discovery application or proxy server applications that were unexpected (and that may be used for debugging), or may include errors in script evaluation. Credential errors may include errors indicating that the available credentials that were provided were not correct for the configuration item(s)

targeted in the schedule. CMDB errors may include errors encountered when attempting to update or create a configuration item in CMDB 500.

Further, examples of sub-categories (or sub-types) may include (i) SNMP connection failure, (ii) missing credentials, (iii) failure to establish an SSH connection or another type of connection, (iv) SSH authentication failure, (v) WINDOWS® and/or LINUX® authentication failure, and/or (vi) other types of authentication failures, among other possibilities.

Furthermore, the error flow GUI may provide in a given region a table or other representation of additional information associated with each error, including but not limited to: (i) the date and/or time the error was discovered, (ii) one or more IP addresses associated with the error, (iii) a priority level indicating the severity of the error (e.g., High, Medium, Low), (iv) a status of the error indicating whether the error is still active or not, (v) a name of the configuration item with which the error is associated, and/or (vi) a short message describing the error. Additionally or alternatively, the error flow GUI may enable the user to take various actions related to an error, and may provide one or more of such actions in a region associated with recommended actions. By way of example, for a given credentials error (e.g., a probe result indicating null credentials), the GUI may provide selectable options to (i) retry discovery of the configuration item with which the credentials error is associated, (ii) assign the error to be resolved by another user (or the user themselves), and/or (iii) create a task for resolving the error, among other possibilities. Other actions are possible as well.

In some embodiments, the homepage GUI may provide information related to configuration items that have the unidentified IP addresses and that are not included in the discovered configuration items. The homepage GUI may provide this information as a separate distinct GUI, for instance. Additionally or alternatively, the homepage GUI may provide this information as an extension of the homepage GUI itself. For example, the homepage GUI may include a selectable element that, when selected via user input, may navigate the user to a separate GUI having a region dedicated to unidentified IP address information, or may trigger a new region of the homepage GUI to be displayed in which the unidentified IP information may appear. In a particular example, the separate GUI or the new region of the homepage GUI may include a focused view of discovery results sorted by unidentified IP addresses.

Examples of conditions that could result in an unidentified IP address may include, but are not limited to, (i) when discovery was able to determine that a configuration item existed at the IP address but was unable to determine the configuration item type (i.e., the classification phase was unable to be completed for the item), (ii) when discovery was able to determine the type of configuration item at the IP address but was not able to uniquely identify the configuration item, and therefore was unable to either update or create a configuration item record (i.e., the classification phase was completed for the item, but the identification phase was not), and/or (iii) when discovery was able to determine the type of configuration item at the IP address, but due to errors (e.g., incorrect credentials or permissions), discovery was unable to explore the configuration item any further.

In line with the discussion above, the information that is provided with respect to a given unidentified IP address may vary depending on the condition that resulted in the unidentified IP address, and the information may take the form of various characteristics associated with the unidentified IP address. For instance, if a configuration item was classified, but not identified, the homepage GUI may provide the type of class to which the configuration item at that unidentified IP address belongs (and perhaps additionally a notification that a record associated with that unidentified IP address has not yet been established). Whereas, if the configuration item was neither classified nor identified, the homepage GUI may provide only the IP address used during the scanning phase. And if one or more errors resulted in discovery being unable to explore the configuration item any further, the homepage GUI may provide a list of the error(s) for the unidentified IP address, and perhaps also various details associated therewith.

Discovering unidentified IP addresses may provide various benefits. For example, it may help the user troubleshoot discovery by quantifying the number of potential devices on a given schedule and determine where additional credentials, updated credentials, and/or updated permissions may help to improve the creation and updating of configuration item records. Additionally or alternatively, it may help the user monitor for new configuration items on the managed network for which credentials may not yet be available. Other benefits are possible as well.

In some embodiments, if the user selects a link associated with the discovery schedules, the discovery system may provide a schedules summary GUI that may provide the user with helpful information regarding past and present schedules and discovery results, which may in turn facilitate reconfiguration for future discovery, as well as facilitate tracking, diagnosing, and resolving errors, both new and recurring. In turn, the schedule summary GUI may provide, either as additional GUIs or as additional regions to the schedule summary GUI itself, detailed discovery results information with varying levels of granularity. Some or all of this information may include any of the information discussed above (e.g., error results), and may be provided either per individual schedule, as cumulative information across a subset of all schedules, or as cumulative information across all schedules.

In some embodiments, for instance, the schedule summary GUI may provide a region including a list of schedules according to which discovery has been carried out and/or is currently being carried out, and perhaps additionally including a total number of schedules that have been created. In this region, the schedule summary GUI may include various information for each schedule, such as the schedule's name, the subnet to which the schedule applies, the location of the managed network (e.g., Seattle), whether the schedule was created in an at least partially automated fashion using the discovery system, and/or definition of the schedule (e.g., Daily, at 5:00 pm). In addition, this region may provide various ways in which to search through and/or sort the schedules. For example, the region may enable the user to search/sort schedules by name, location, definition, etc.

As another example, the region may enable the user to sort schedules by other criteria, such as total numbers of configuration items, errors, and/or unidentified IP addresses. In particular, the region may enable the user to sort the schedules in order of (i) the total number of errors discovered the last time discovery was carried out according to a schedule, (ii) the total number of errors discovered over a period of time during which discovery was carried out according to a schedule (e.g., the number of errors discovered in the previous week), (iii) the total number of errors discovered over a quantity of times discovery was carried out according to a schedule (e.g., the last ten times the schedule was carried out), (iv) the total number of configuration items discovered the last time discovery was carried out according to a schedule, (v) the total number of configuration items discovered over a period of time during which discovery was carried out according to a schedule, (vi) the total number of configuration items discovered over a quantity of times discovery was carried out according to a schedule, (vii) the total number of unidentified IP addresses from the last time discovery was carried out according to a schedule, (viii) the total number of unidentified IP addresses over a period of time during which discovery was carried out according to a schedule, and/or (ix) the total number of unidentified IP addresses over a quantity of times discovery was carried out according to a schedule, among other possibilities. Some or all of this sorting may occur from most to least, or vice versa.

Similar to the homepage GUI, the schedule summary GUI may include running number totals, although such number totals may be with respect to a smaller number of configuration items.

In some embodiments, the schedule summary GUI may enable the user to select a given schedule from the list and may include a region in which, when a schedule is selected, number totals for high-level discovery results categories such as discovered configuration items, errors, unidentified IP addresses, and targeted IP addresses (e.g., a total number of distinct IP addresses within the subnet subject to the selected schedule) may appear. In line with the discussion above, if discovery is currently being carried out according to the selected schedule (e.g., a daily-scheduled discovery is running), the number totals may or may not change to reflect the results of discovery being carried out according to the selected schedule. In any event, the schedule summary GUI may include a region displaying the duration of the schedule—either a time elapsed thus far for the current scheduled discovery being carried out, or a total time that a scheduled discovery took to complete. Additionally or alternatively, the schedule summary GUI may include a text-based indication of the selected schedule is ongoing or not, such as by displaying that the schedule is "In Progress" or "Completed."

In these embodiments, after a schedule is selected, the schedule summary GUI may enable the user to select one or more of the discovery results categories that relate to that schedule, and in response to the selection of one of the discovery results categories, the schedule summary GUI may display additional information related to the selected category. For example, the schedule summary GUI may display a region including a graph that represents a trend relating to the selected category over a period of time and/or over a number of times discovery was carried out according to the schedule. As a more particular example, if the category of discovered configuration items is selected, a line graph may appear below the categories that displays number totals for discovered configuration items over the past month as a result of that schedule, as well as indications as to whether those numbers have increased or decreased over time. Similar to the number totals discussed herein, the graph may change in real-time if discovery is being carried out according to a schedule while the graph is being displayed. Further, the GUI may support various forms of user interaction with the graph, some of which may cause other information to be displayed. For instance, the graph may include icons associated with each previous runtime of the schedule, and if the user clicks, hovers over, or otherwise selects one of those icons, a pop-up box may appear that includes a brief summary of the results of the previous runtime (e.g., total numbers of discovered configuration items, errors, unidentified IP addresses, and targeted IP addresses), thereby providing the user with a quick, easy manner in which to view and compare results from multiple schedules.

Furthermore, as another example, in response to the selection of one of the discovery results categories, the schedule summary GUI may display information similar to the information discussed above with respect to the discovered configuration item GUI(s) and the error flow GUI(s), but with respect to the selected schedule. As a particular example, if the category of errors is selected, a region of the GUI may include number totals by category and/or sub-category. Selection of some of this information may in turn cause the GUI to display even more detailed information. As a particular example, the region may include a total number of credentials errors, the user may select a GUI element associated with the credentials errors, and the GUI may responsively display a more-detailed list of each of the credentials errors associated with the selected scheduled. The user may then navigate to view and perhaps select a particular credentials error, upon which the GUI may responsively display detailed information associated with the selected credentials error. Other examples are possible as well. In any event, these and other embodiments of the schedule summary GUI may enable the user to navigate, sort, and review discovery results in multiple distinct levels of detail.

In some embodiments, one or more of the discovery GUIs discussed above may be arranged in a particular way in order to provide improved and streamlined access to discovery scheduling information and discovery results information. For instance, the GUIs may be ordered such that higher-level, broader information is provided first, and the user is then provided with the ability to navigate down to more-detailed information. As a particular example, the discovery homepage may in turn link to the discovered configuration item page, error flow page, and schedule summary page. Each of these subsequent three pages may or may not each link to each other, but each may in turn link to additional pages (e.g., an errors by category page may link to an errors by sub-category page). Other examples are possible as well.

In some embodiments, one or more of the GUIs discussed above, such as the schedule summary GUI, may include an element that, when selected, directs the user to create a new schedule. Additionally or alternatively, one or more of the GUIs discussed above may include elements that, when selected, may navigate the user back to a previous GUI.

In some embodiments, the discovery system may facilitate additional processes relating to preparation for, scheduling of, and reviewing results of discovery. For example, the discovery system may provide a process for the user to set up the CMDB, and in some scenarios may be configured to prevent the user from setting up proxy servers until setup of the CMDB is complete. As another example, the discovery system may provide a process for the user to set up operational metrics for identifying potential service outages and/or other errors relating to discoverable configuration items, which may help the user prevent such errors from occurring. Such operational metrics may be based on historical threshold data and may indicate anomalous behavior of configuration items indicative of the configuration items' risk of causing outages and/or other errors. Other examples are possible as well.

Each of the figures described in the following paragraphs provides an example GUI that a computing system (e.g., computing device 100) may provide as part of a computational instance of remote network management platform 320 (e.g., computational instance 322).

FIGS. 6, 7, 8, 9, and 10, each relate to a guided setup process for preparing for discovery and scheduling discovery to occur.

Figure 6:
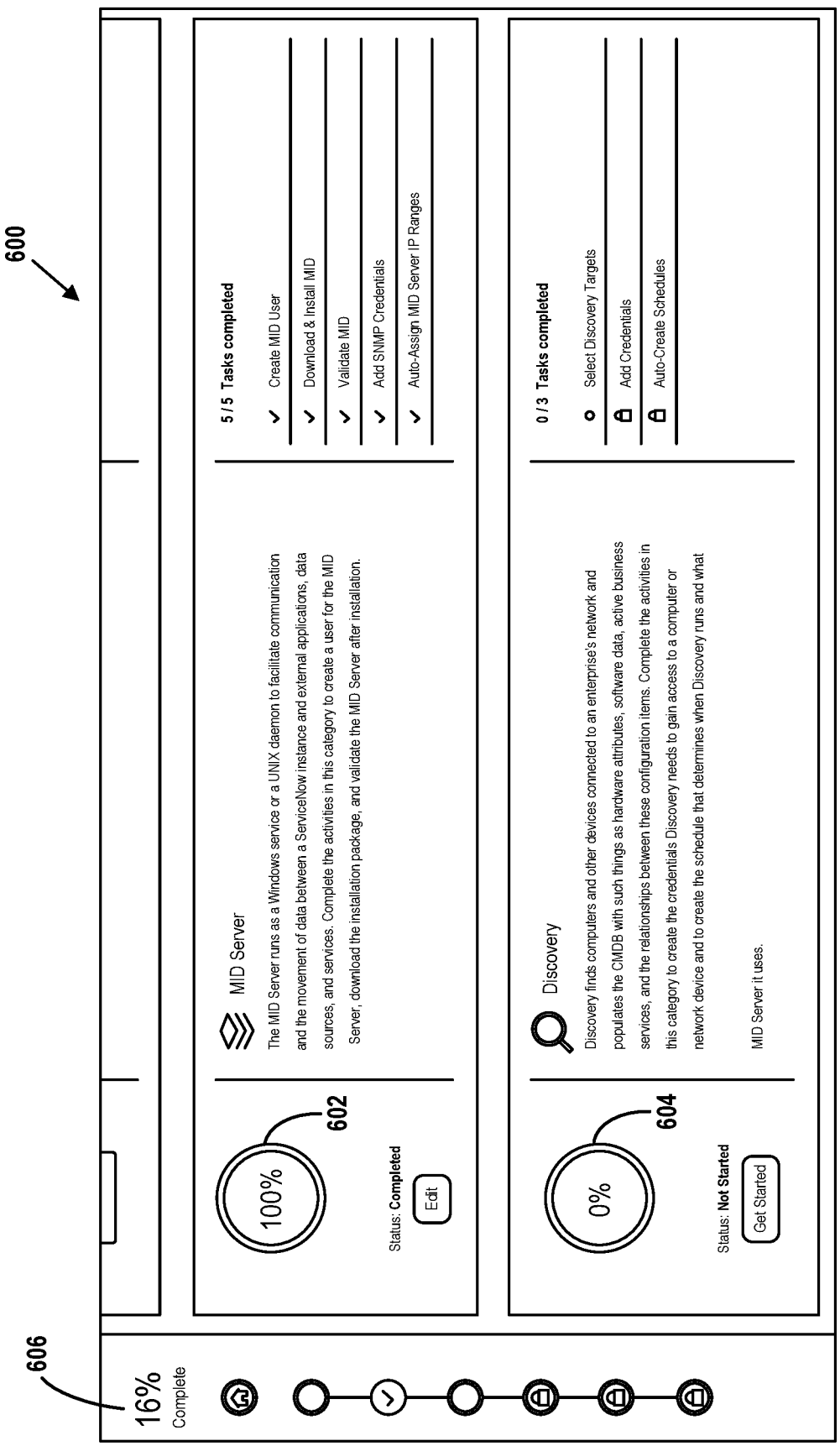
FIG. 6 illustrates an example GUI, in accordance with example embodiments.

FIG. 6 illustrates an example GUI 600 relating to proxy server setup and discovery setup. In particular, the GUI provides a respective progress indicator for proxy server setup 602, for discovery setup 604, and for an overall setup 606 (e.g., proxy server plus discovery). Further, as shown on a right side of GUI 600, proxy server setup involves five tasks, and discovery setup involves three tasks. When a task has been complete, a check mark or other indicator may appear next to the task. The five proxy server setup tasks include: (i) creating a proxy server user account (ii) downloading and installing a proxy server, (iii) validating the proxy server, (iv) adding SNMP credentials, and (v) auto-assigning an IP address range to the proxy server. The three discovery tasks include: (i) selecting configuration item types to discover, (ii) adding credentials, and (iii) auto-creating schedules. In addition, as shown, discovery setup may be locked until proxy server setup is complete.

Figure 7:
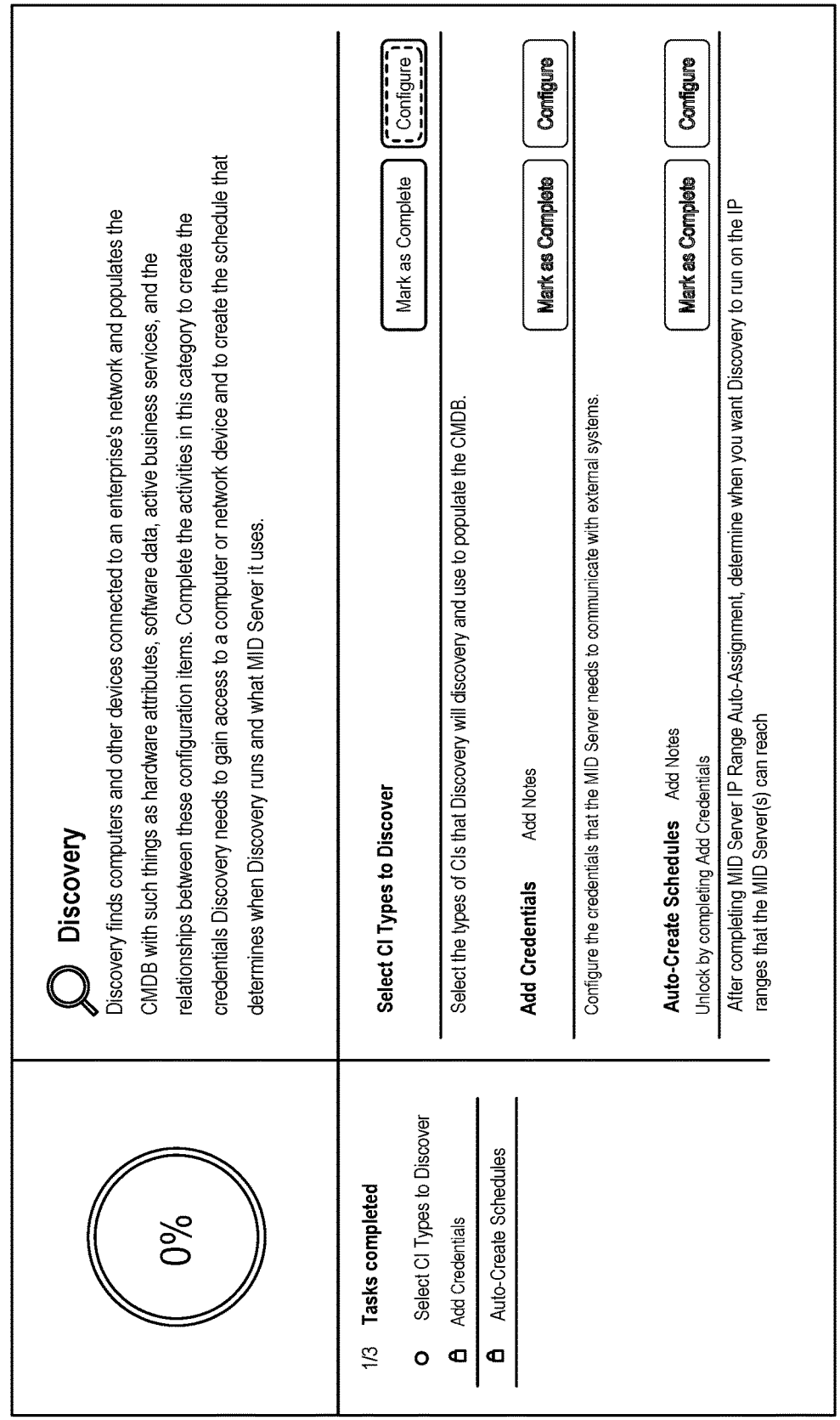
FIG. 7 illustrates an example GUI, in accordance with example embodiments.

FIG. 7 illustrates an example GUI 700 relating to discovery setup. On a left side of GUI 700, GUI 700 provides a progress indicator 702 for discovery setup. Further, GUI 700 provides additional details for each of the three tasks that are also shown in GUI 600 of FIG. 6. In addition, GUI 700 enables the user to select either an option to "configure" a particular task, or select an option to mark the task as complete. Further, configuration of subsequent tasks may be locked until the current task is complete.

Figure 8:
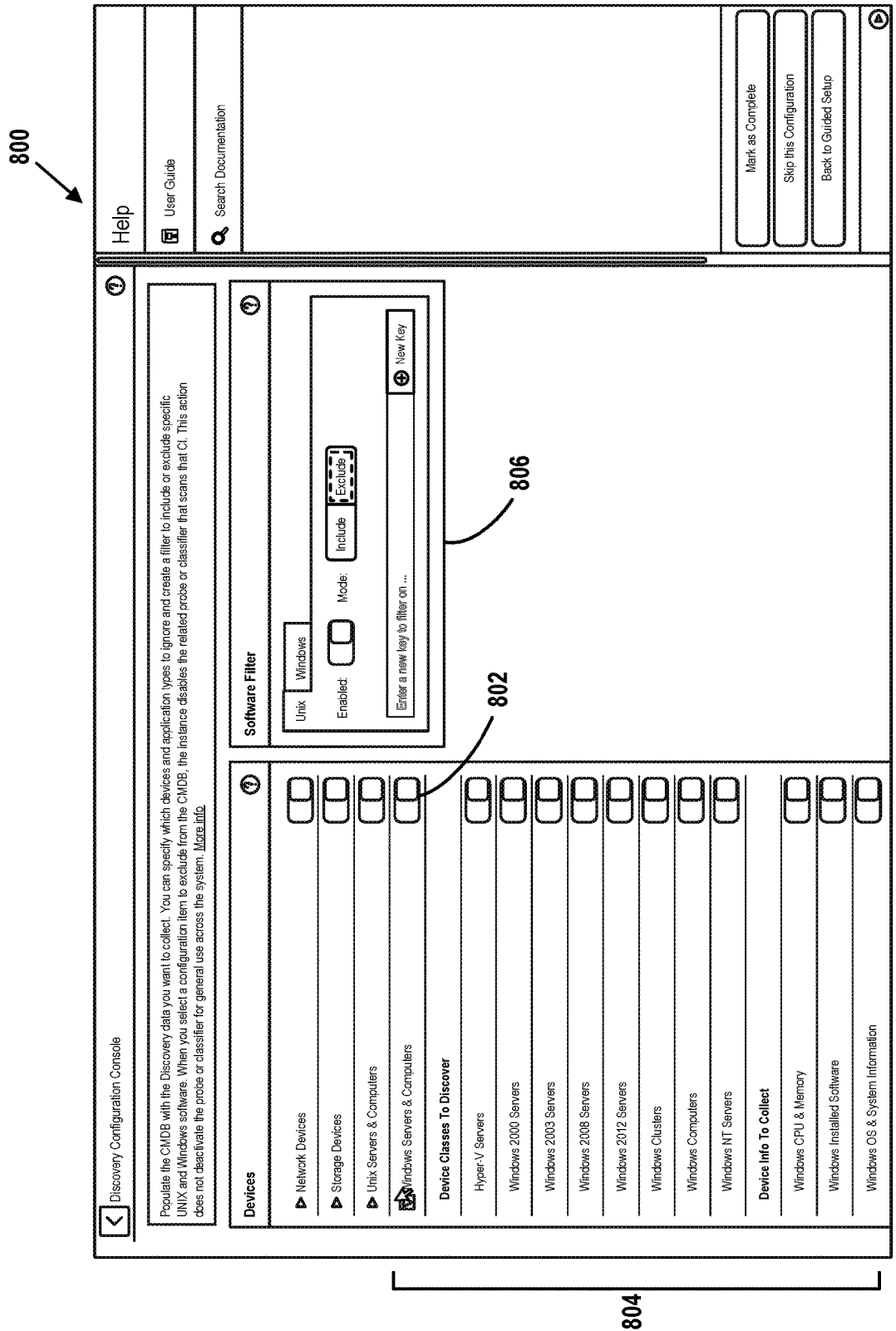
FIG. 8 illustrates an example GUI, in accordance with example embodiments.

FIG. 8 illustrates an example GUI 800 relating to selecting which configuration items to discover. GUI 800 allows for a user to determine, with varying granularity, which configuration items to include or exclude in discovery. For example, as shown, GUI 800 provides, for each of four high-level configuration item types—network devices, storage devices, UNIX® servers and computers, and WINDOWS® servers and computers—a selectable option to include or exclude all configuration items of that type, such as selectable option 802. A GUI such as GUI 800 may also provide options to include or exclude configuration items at a more granular level. As shown, for instance, the GUI provides, under the heading of WINDOWS® servers and computers, a drop-down menu 804 of selectable options to include or exclude certain classes of WINDOWS® servers and computers (e.g., WINDOWS® 2000 servers, WINDOWS® clusters) and certain information relating to WINDOWS® servers and computers (e.g., WINDOWS® CPU and memory, WINDOWS® installed software). In addition, GUI 800 includes a region 806 dedicated to a software filter, the region including options to include or exclude UNIX® and/or WINDOWS® software in discovery.

Figure 9:
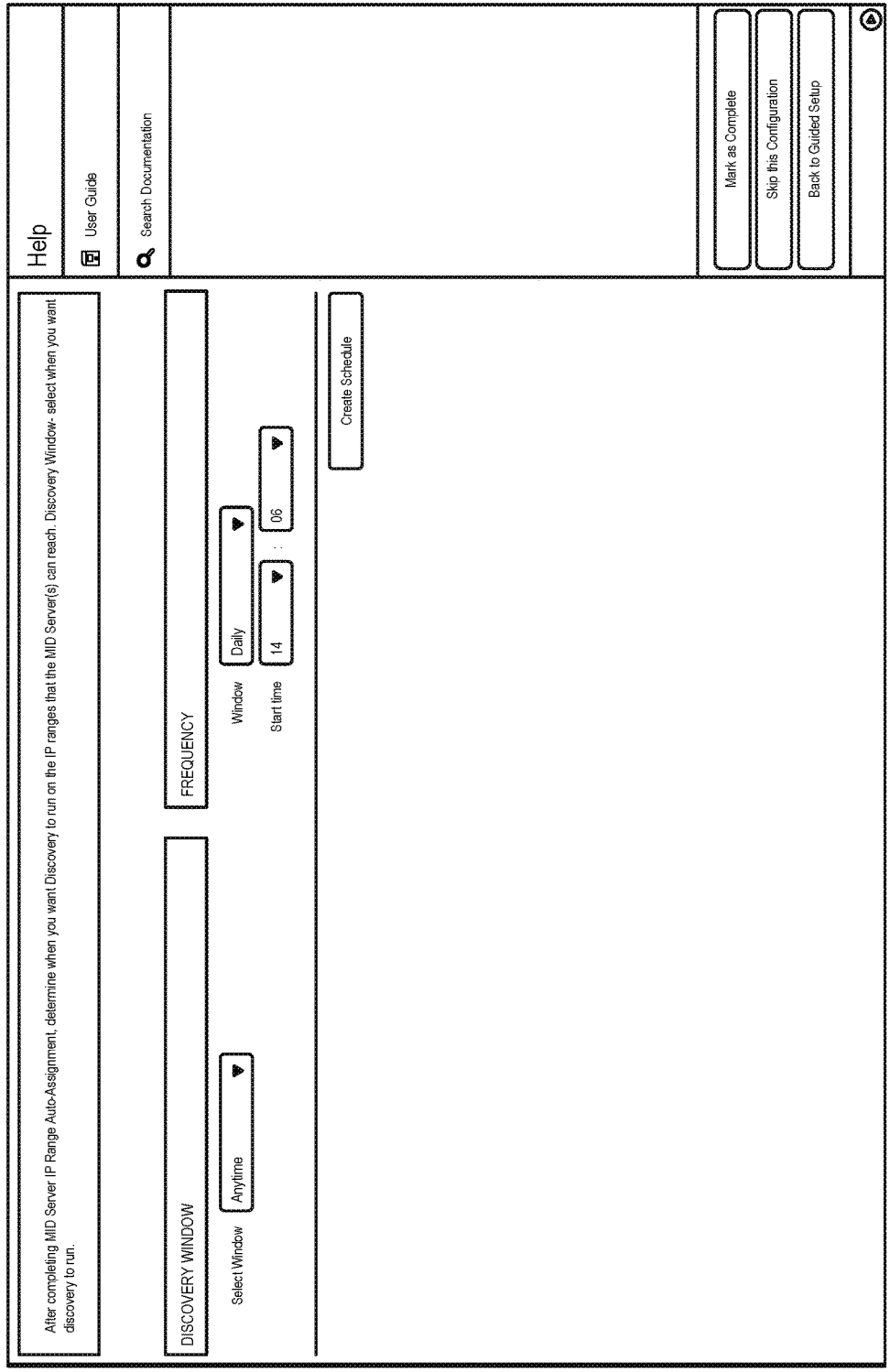
FIG. 9 illustrates an example GUI, in accordance with example embodiments.

FIG. 9 illustrates an example GUI 900 relating to scheduling when to carry out discovery. As shown, an option for "Anytime" has been selected and the schedule is defined such that it will occur daily at 2:06 pm.

Figure 10:
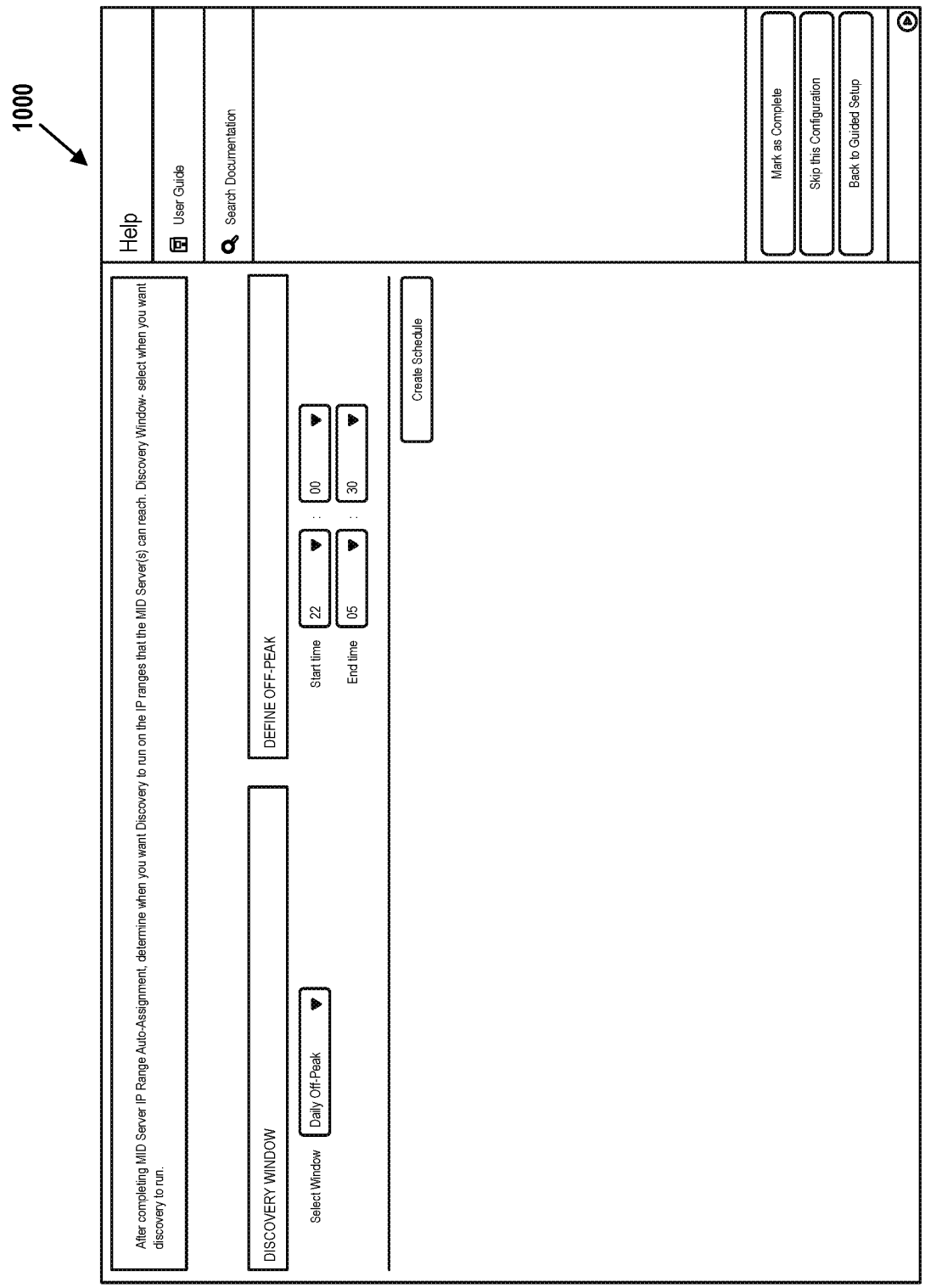
FIG. 10 illustrates an example GUI, in accordance with example embodiments.

FIG. 10 illustrates an example GUI 1000 relating to scheduling when to carry out discovery. As shown, an option for Daily Off-Peak has been selected and the schedule is defined such that it will occur on a daily basis starting at 10:00 pm until 5:30 am the next day.

FIGS. 11, 12, 13, 14, 15, 16, 17, 18, 19, 20, 21, 22, 23, 24, 25, and 26 illustrate example related GUIs for streamlining review of discovery results. Some of these GUIs include a region on the left side having a scrollable discovery menu including selectable options such as Dashboard, Discovery Schedules, Status, Credentials, Discovery Range Sets, Proxy Servers (shown as "MID Servers"), and Tracked Configuration Files, among others. In practice, selection of any of these options may trigger display of a GUI corresponding to the particular selection, or may trigger display in the same region of a drop-down menu including more-detailed selectable options.

Figure 11:
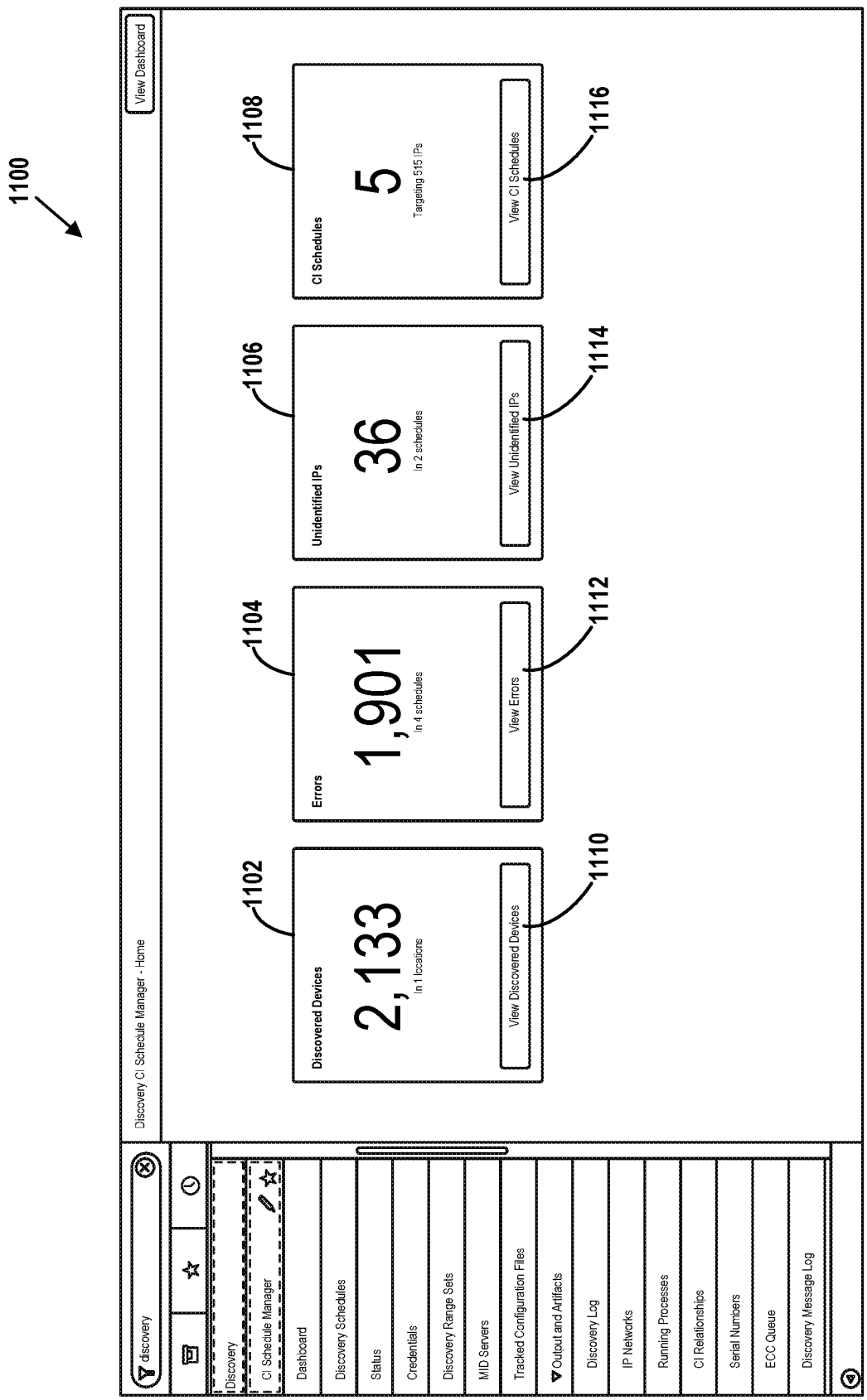
FIG. 11 illustrates an example GUI, in accordance with example embodiments.

FIG. 11 illustrates an example discovery homepage GUI 1100 (shown as Discovery CI Schedule Manager). The homepage GUI includes number totals for four discovery results categories: discovered configuration items (shown as Discovered Devices), errors, unidentified IP addresses, and schedules (shown as CI Schedules). The regions in which these numbers appear—regions 1102, region 1104, region 1106, and region 1108, respectively—may be selectable in practice to navigate to subsequent related GUIs. Additional information relating to respective categories is included below each number total: a number of locations in which devices are being discovered, a number of schedules in which the errors were discovered, a number of schedules in which the unidentified IP addresses were discovered, and a total number of IP addresses targeted between all existing schedules. Also shown are selectable links to view discovered devices, view errors, view unidentified IP addresses, and view schedules: link 1110, link 1112, link 1114, and link 1116, respectively. These links, when selected, may trigger display of a discovered configuration items page, error flow page, unidentified IP addresses region/page, and schedule summary page, respectively.

Figure 12:
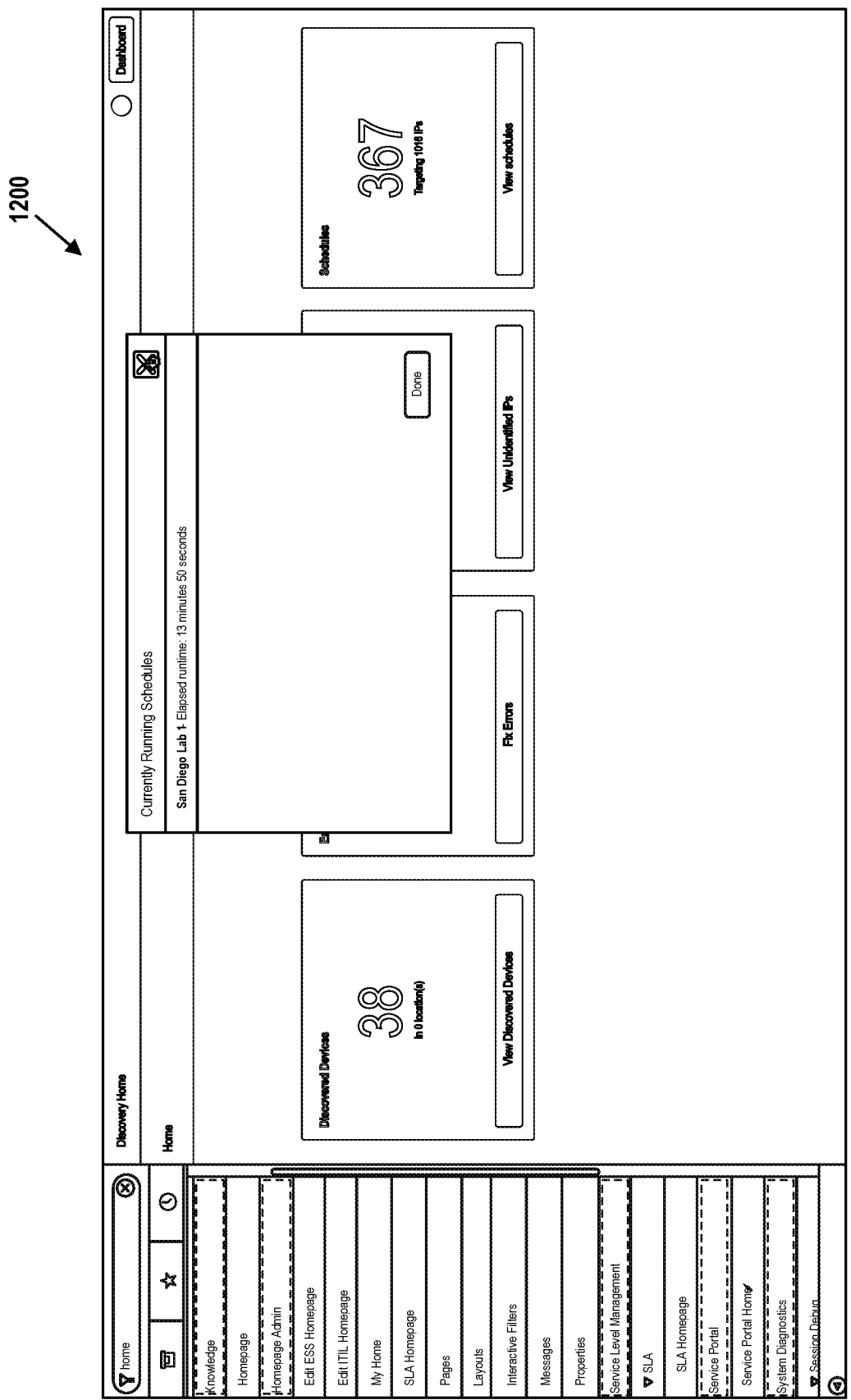
FIG. 12 illustrates an example GUI, in accordance with example embodiments.

FIG. 12 illustrates an example discovery homepage GUI 1200 in which a pop-up window indicates schedules that are currently running, as well as the elapsed time for each such schedule. Display of such a pop-up window may occur in response to various triggers, such as selection of a scrollable menu option to view schedules.

Figure 13:
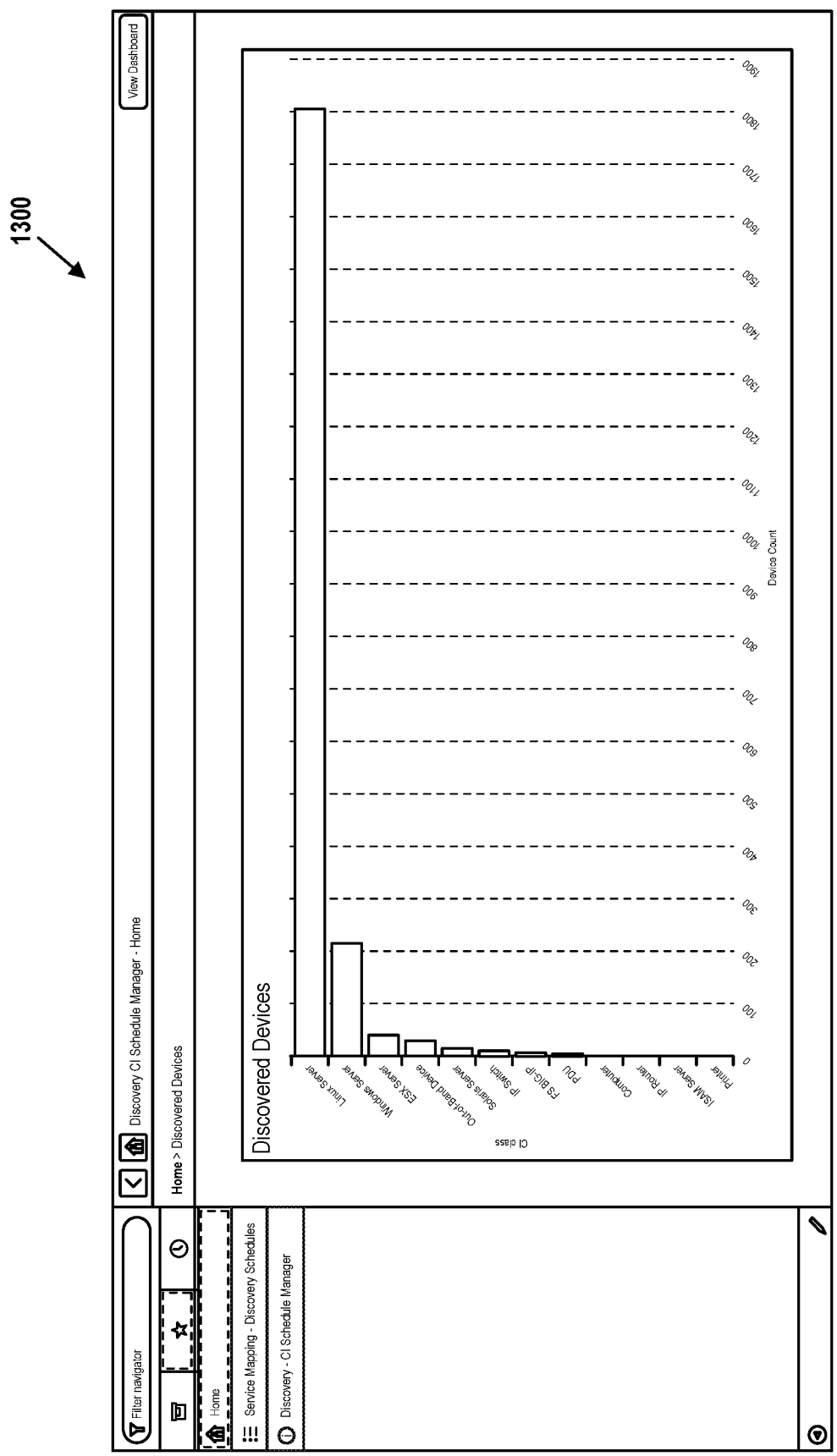
FIG. 13 illustrates an example GUI, in accordance with example embodiments.

FIG. 13 illustrates an example discovered configuration items GUI 1300 (shown as Discovered Devices) including a bar graph representation of total numbers of various classes (e.g., LINUX® servers, IP routers, printers) of configuration items.

Figure 14:
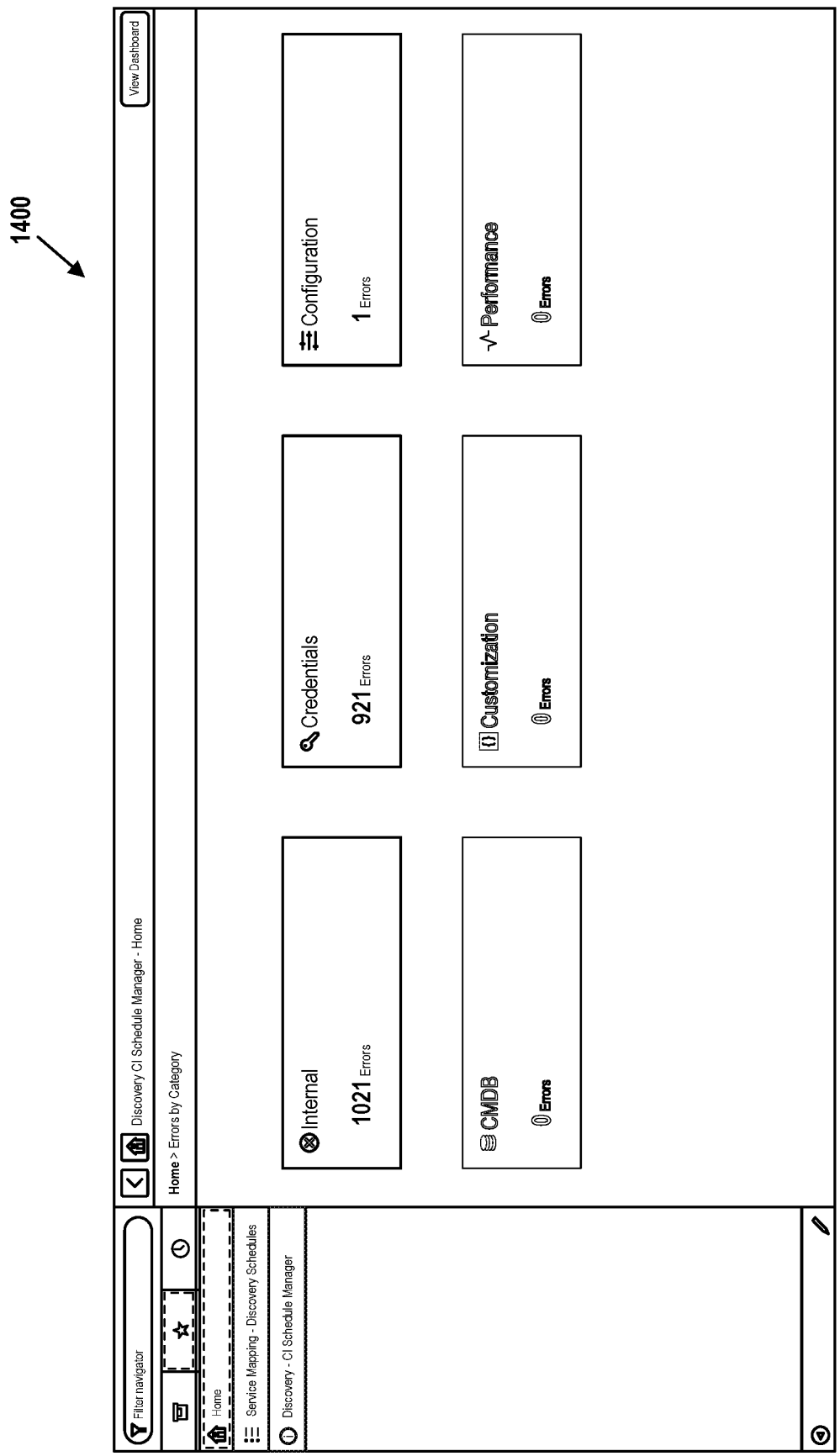
FIG. 14 illustrates an example GUI, in accordance with example embodiments.

FIG. 14 illustrates an example error flow GUI 1400, serving itself as a homepage to facilitate error diagnosis (shown as Errors by Category). As shown, the error flow GUI includes various error categories, and total numbers for each such category.

Figure 15:
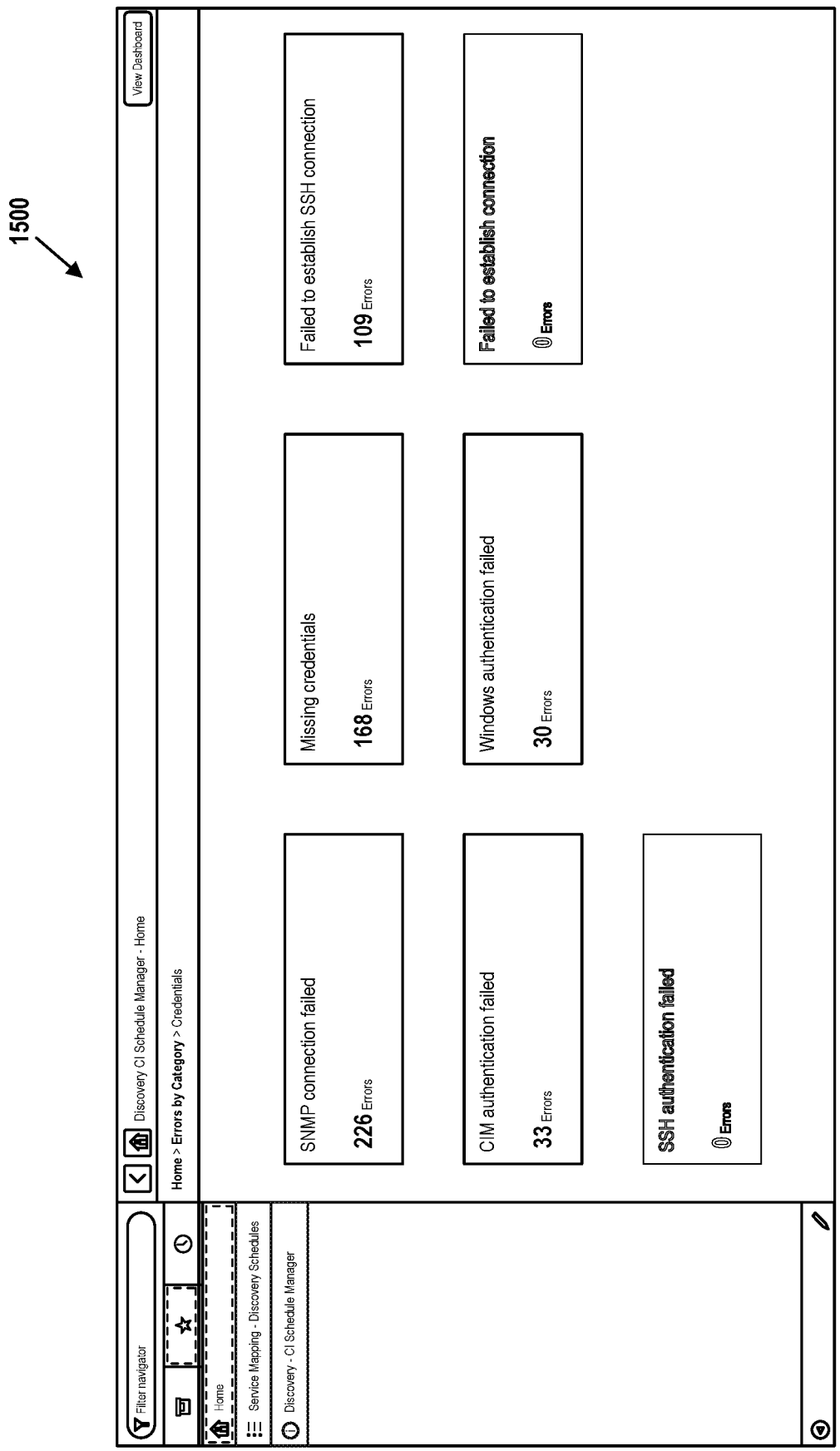
FIG. 15 illustrates an example GUI, in accordance with example embodiments.

FIG. 15 illustrates another example error flow GUI 1500 displayed in response to a user selection of the credentials category of errors in the previous GUI 1400 of FIG. 14. As shown, GUI 1500 includes various error sub-categories that are specifically associated with the credentials category, and total numbers for each such sub-category.

Figure 16:
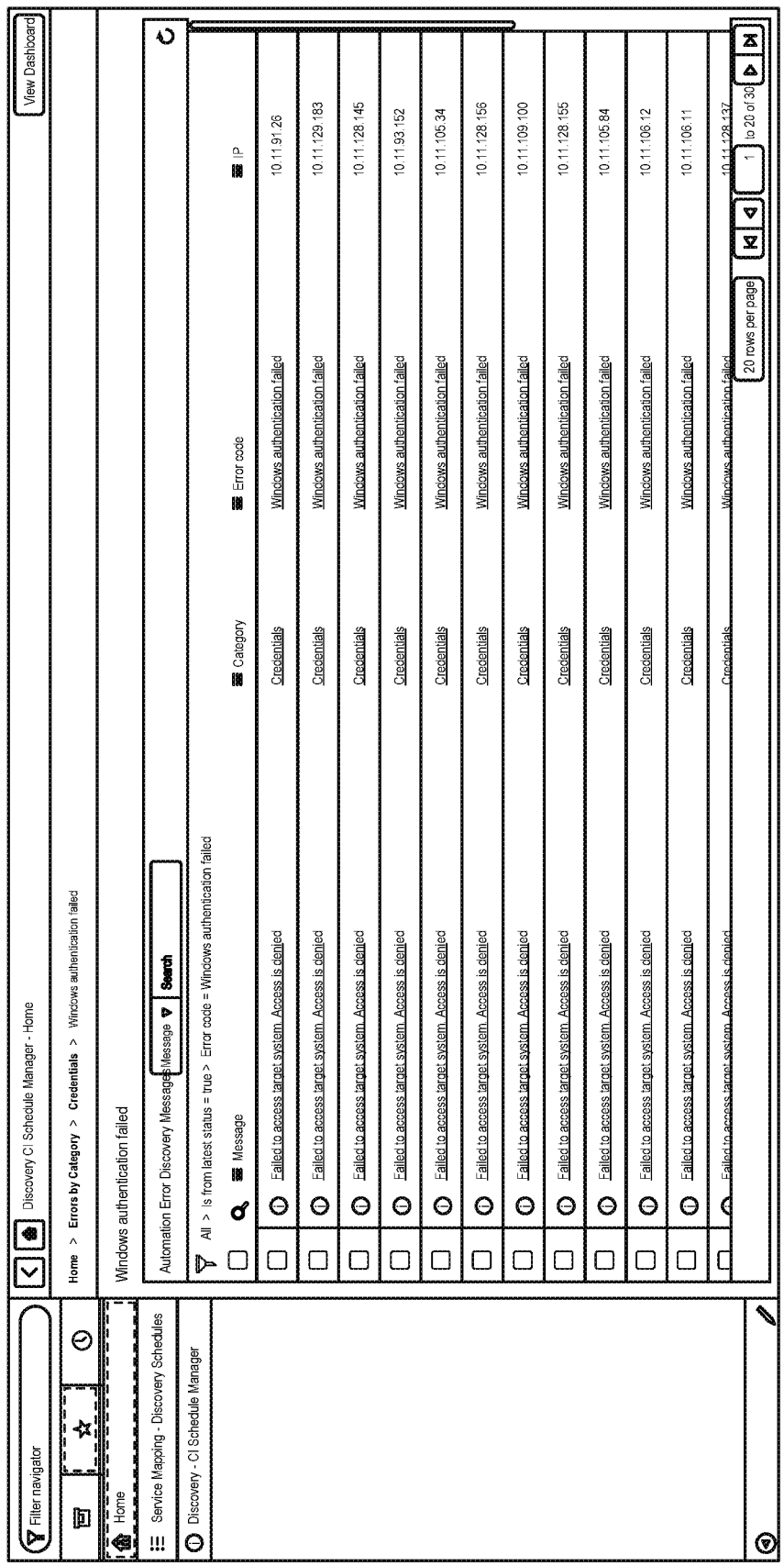
FIG. 16 illustrates an example GUI, in accordance with example embodiments.

FIG. 16 illustrates another example error flow GUI 1600 displayed in response to a user selection of the WINDOWS® authentication failed sub-category in the previous GUI 1500 of FIG. 15. As shown, GUI 1600 includes a table listing specific WINDOWS® authentication failed errors and including columns for error messages, error categories, error codes, and IP addresses.

Figure 17:
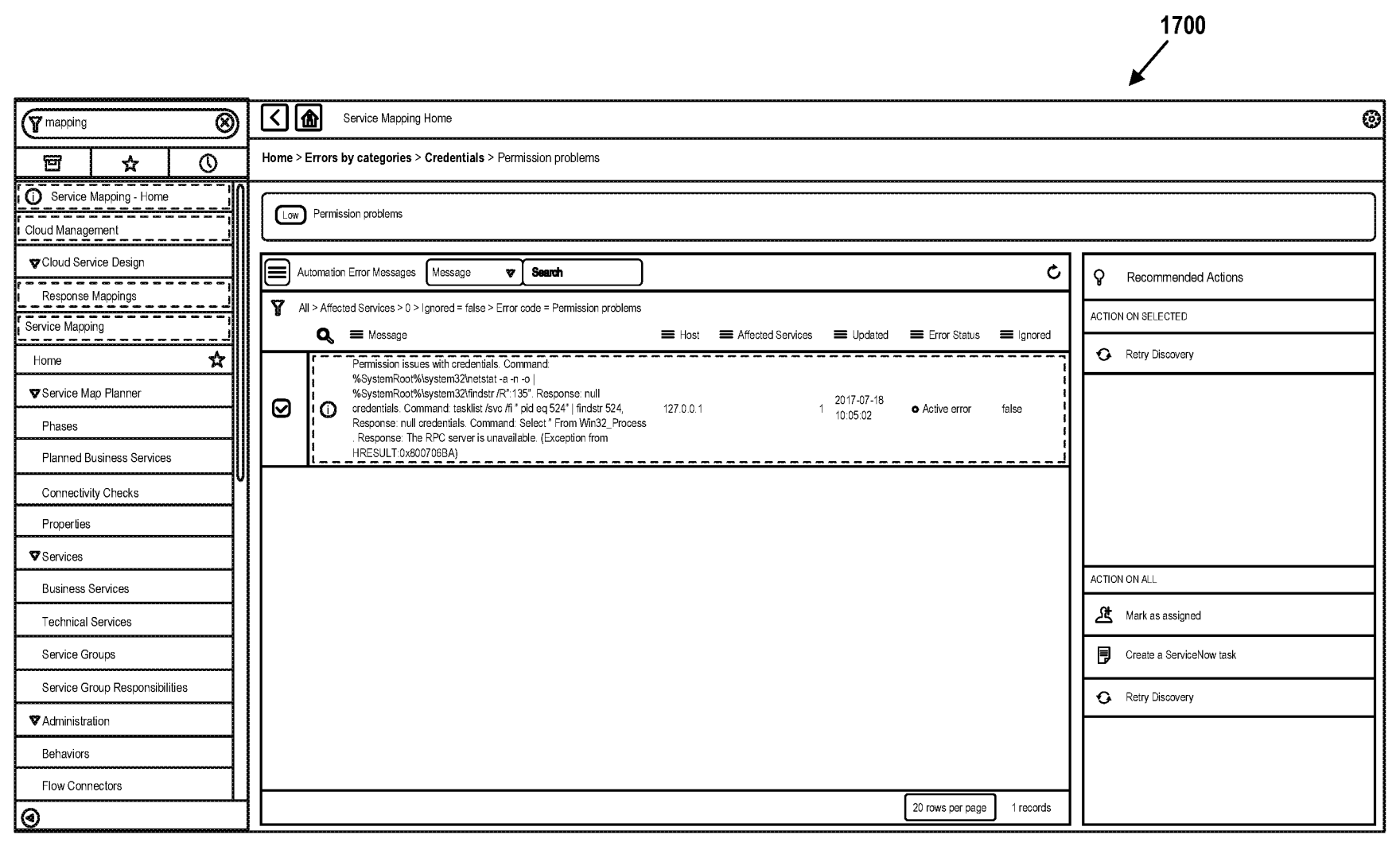

FIG. 17 illustrates another example error flow GUI 1700 displayed in response to a user selection of a particular credentials error in an error table. As shown, GUI 1700 includes, for the particular error, columns defining various information associated with the error (e.g., the host IP to which the error is attributed, the date and time the credentials at issue were last updated, and an error status). In a region to the right, GUI 1700 includes recommended actions for handling the error.

Figure 18:
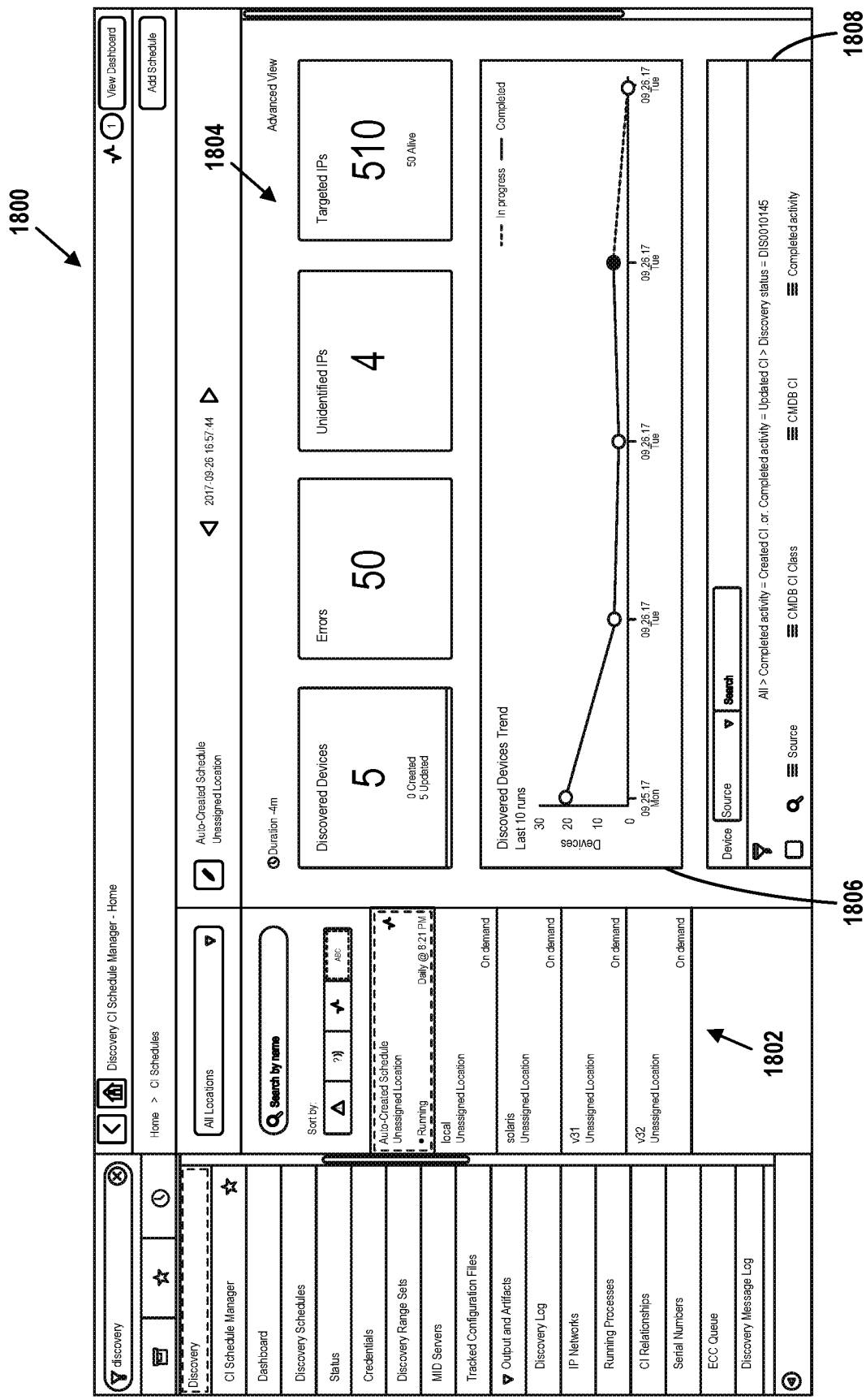
FIG. 18 illustrates an example GUI, in accordance with example embodiments.

FIG. 18 illustrates an example schedule summary GUI 1800 for facilitating a per-schedule analysis of discovery results. As shown, GUI 1800 includes a schedules region 1802 listing existing schedules and a per-schedule region 1804 including, for a particular selected schedule, total numbers for four discovery results categories: discovered configuration items, errors, unidentified IP addresses, and targeted IP addresses. The per-schedule region 1804 further includes a trend region 1806 in which, when a particular one of the four categories is selected, a trend graph is displayed, the trend graph illustrating how the numbers relating to the selected category have changed over the course of ten previous times discovery was carried out according to the selected schedule. In particular, GUI 1800 illustrates selection of the discovered configuration items category, and thus, displayed in the trend region 1806 in response to the selection is a trend graph illustrating how many configuration items were discovered over the course of the ten previous times discovery was carried out according to the selected schedule. In addition, below the trend graph is a table 1808 for viewing more information related to such configuration items. In variations of this embodiment, trend information may be represented in other ways, different from a graph.

Figure 19:
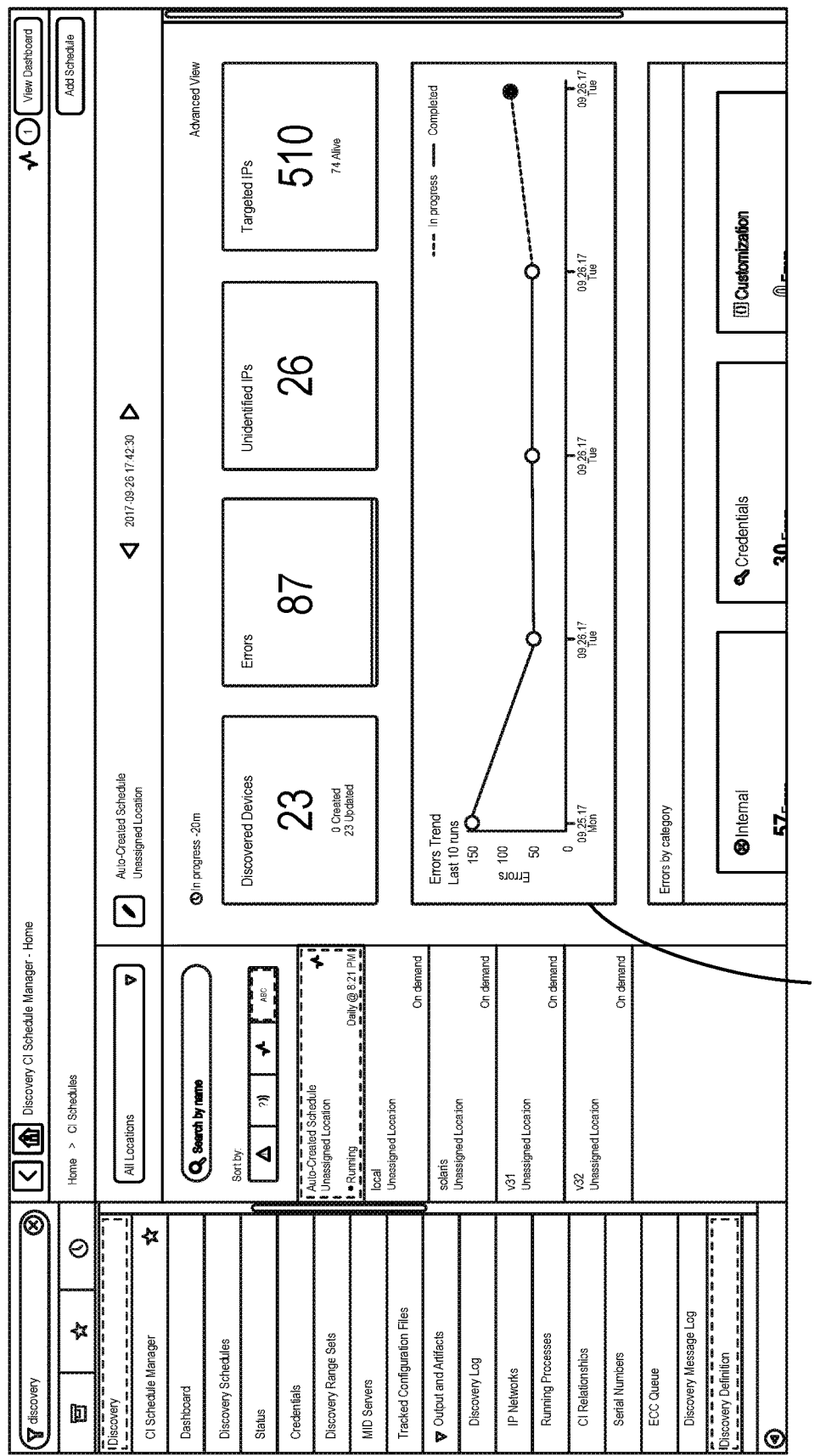
FIG. 19 illustrates an example GUI, in accordance with example embodiments.

FIG. 19 illustrates an example schedule summary GUI 1900 similar to GUI 1800 of FIG. 18. In particular, the GUI of FIG. 19 illustrates selection of the errors category, and thus, displayed in trend region 1902 in response to the selection is a trend graph illustrating how many errors were discovered over the course of the ten previous times discovery was carried out according to the selected schedule. In addition, below the trend graph is a table for viewing more information related to such errors. In particular, shown below the trend graph is a region resembling the Errors by Category GUI 1400 of FIG. 14.

Figure 20:
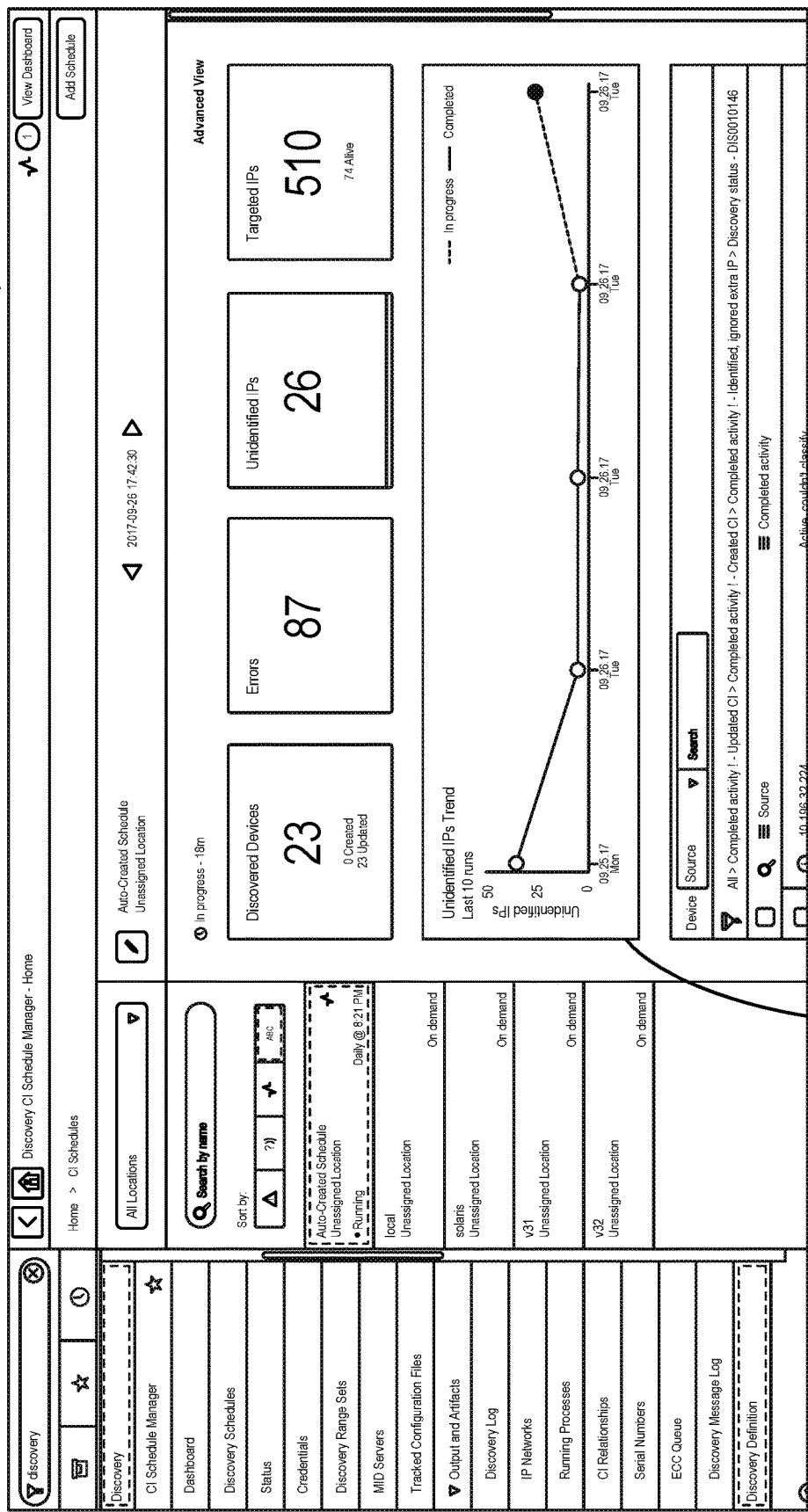
FIG. 20 illustrates an example GUI, in accordance with example embodiments.

FIG. 20 illustrates an example schedule summary GUI 2000 similar to GUI 1800 and GUI 1900 of FIGS. 18 and 19. In particular, GUI 2000 illustrates selection of the unidentified IP addresses category, and thus, displayed in trend region 2002 in response to the selection is a trend graph illustrating how many unidentified IP addresses were discovered over the course of the ten previous times discovery was carried out according to the selected schedule. In addition, below the trend graph is a table for viewing more information related to such unidentified IP addresses. Such a table may include columns specifying the IP address(es) at issue, and specifying whether the configuration item associated therewith has been classified or not.

Figure 21:
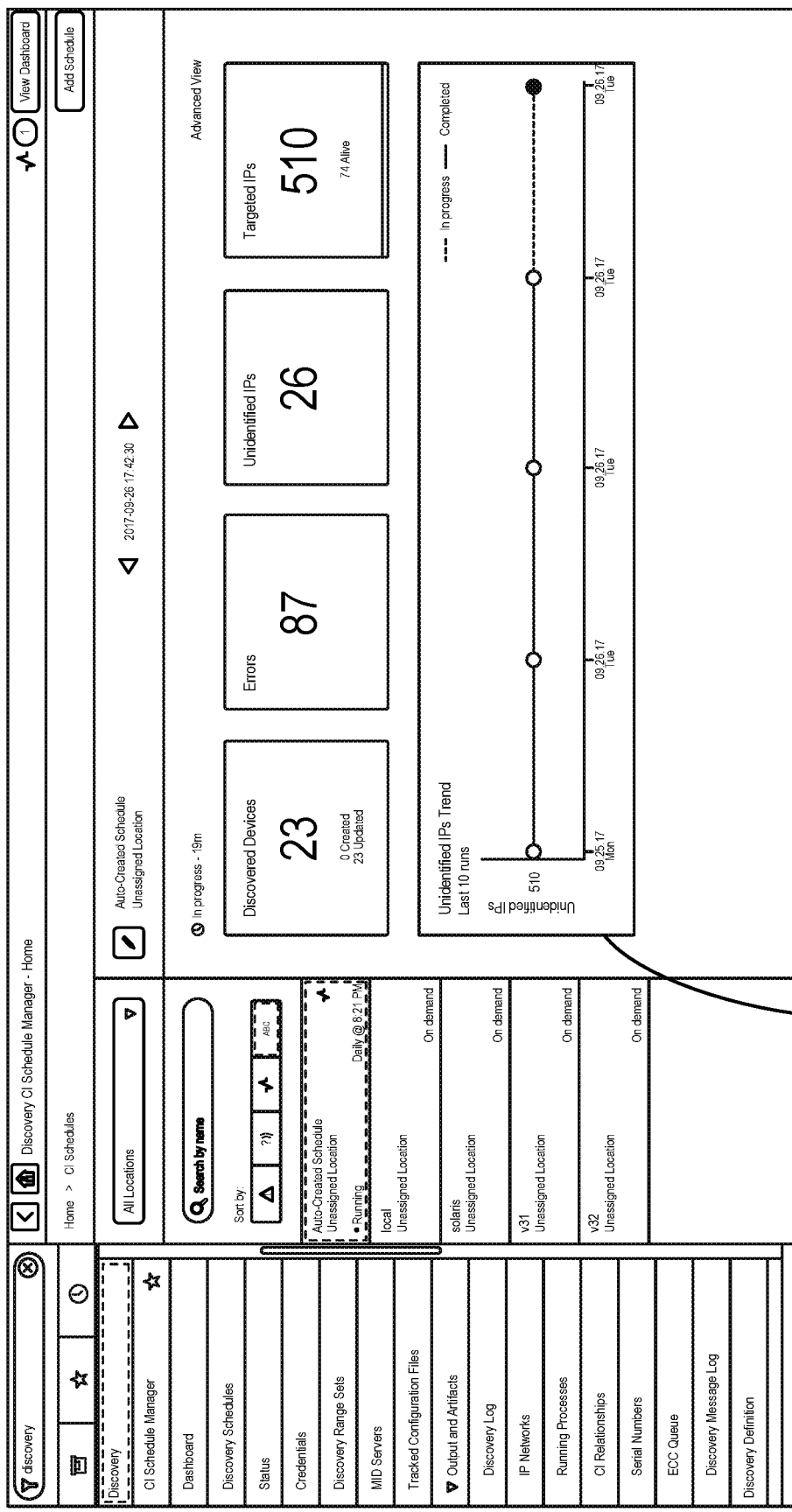
FIG. 21 illustrates an example GUI, in accordance with example embodiments.

FIG. 21 illustrates an example schedule summary GUI 2100 similar to that of GUI 1800, GUI 1900, and GUI 2000 of FIGS. 18, 19, and 20. In particular, GUI 2100 illustrates selection of the targeted IP addresses category, and thus, displayed in trend region 2102 in response to the selection is a trend graph illustrating how many IP addresses were targeted over the course of the ten previous times discovery was carried out according to the selected schedule.

Figure 22:
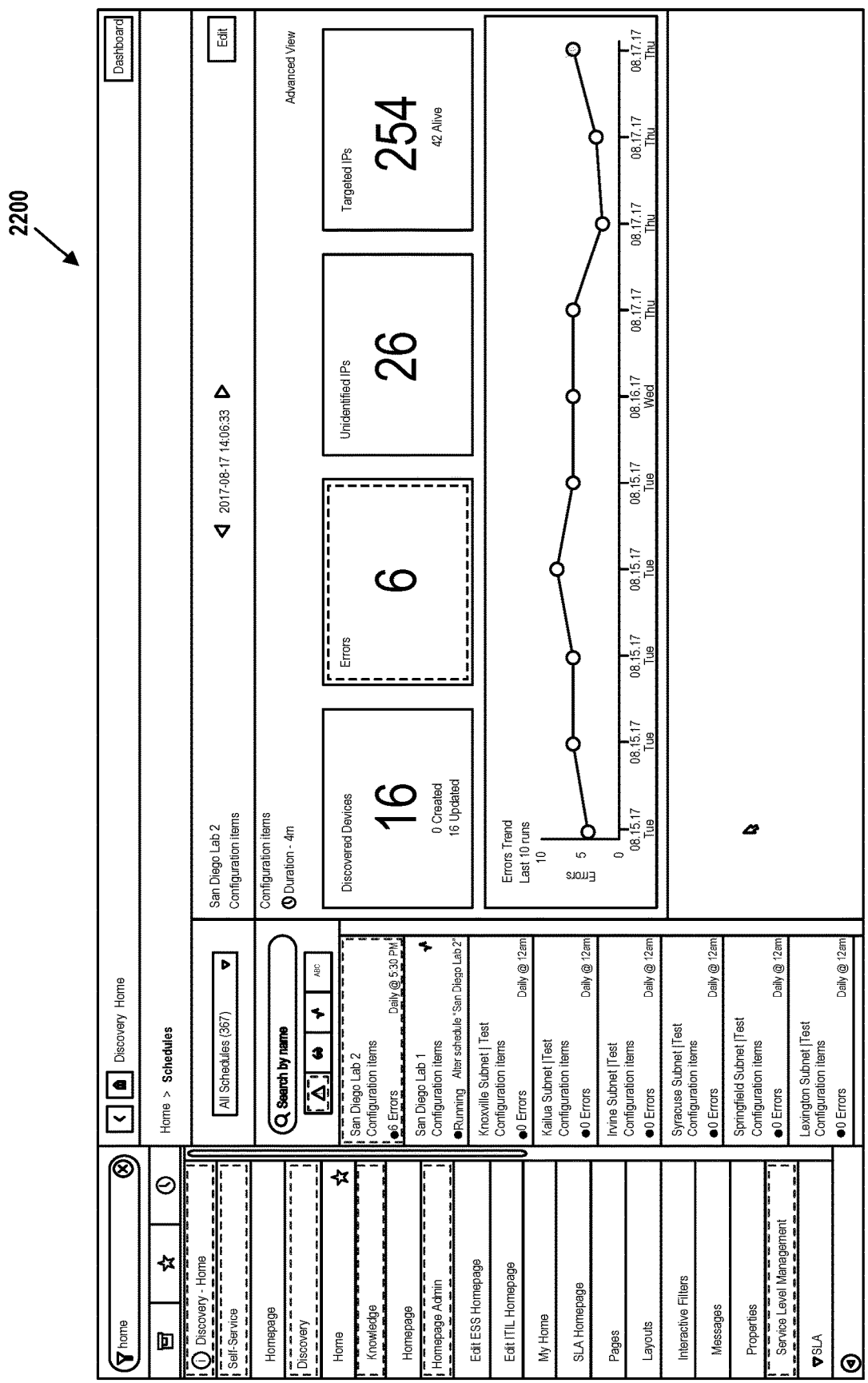
FIG. 22 illustrates an example GUI, in accordance with example embodiments.

FIG. 22 illustrates another example schedule summary GUI 2200 listing schedules associated with a large variety of subnets, illustrating selection of the errors category, and therefore including an errors trend graph associated with a selected schedule.

Figure 23:
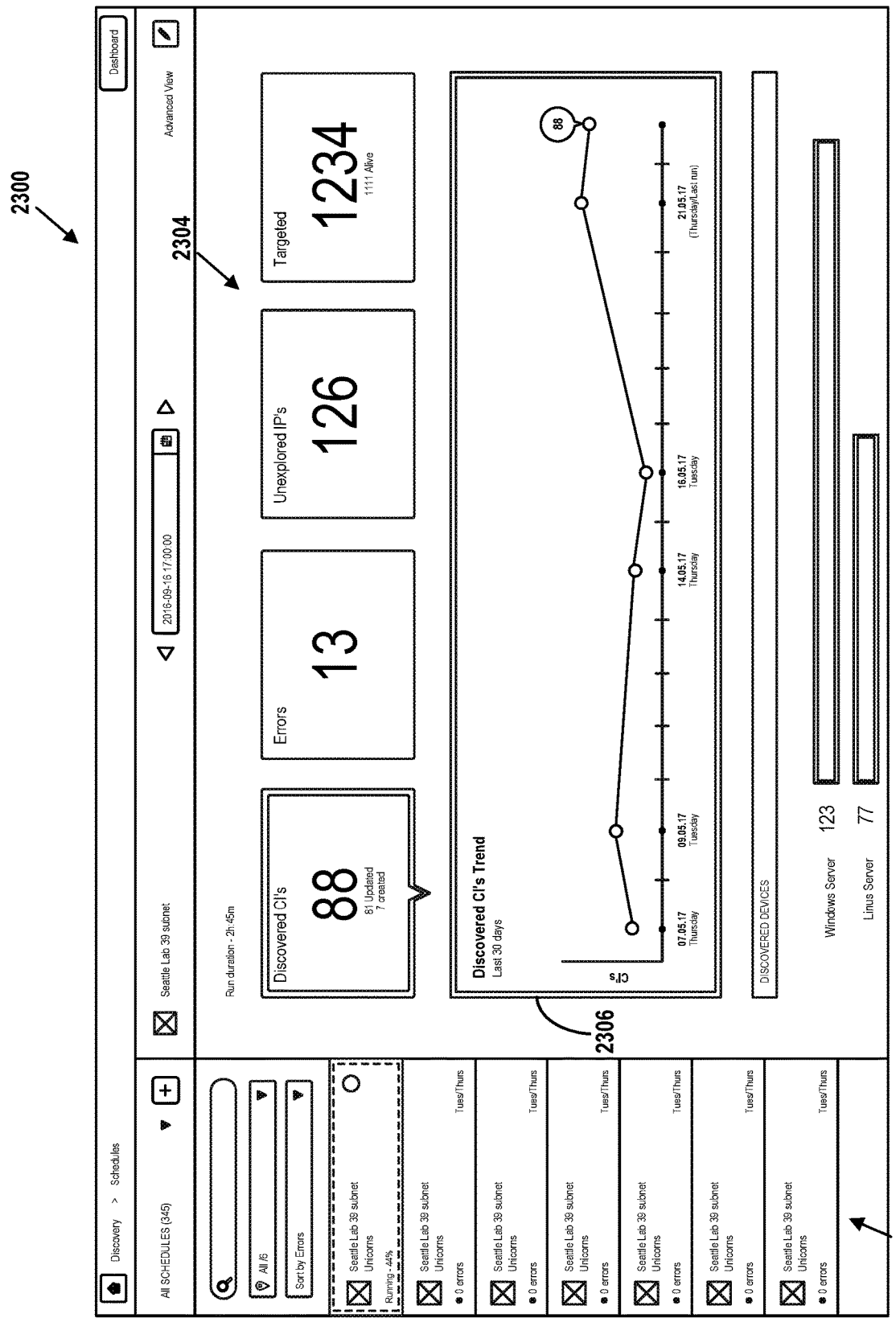
FIG. 23 illustrates an example GUI, in accordance with example embodiments.

FIG. 23 illustrates a different appearance that a schedule summary GUI may take. In particular, GUI 2300 includes a schedules region 2302, per-schedule region 2304, and trend region 2306, each similar in appearance to the corresponding regions discussed above. As shown, GUI 2300 illustrates selection of the discovered configuration items category, and thus, displayed in the trend region 2306 in response to the selection is a trend graph illustrating how many configuration items were discovered over the course of the thirty days during which discovery was carried out according to the selected schedule. In addition, below the trend graph are bars indicating how many of each type of discovered configuration item was discovered.

Figure 24:
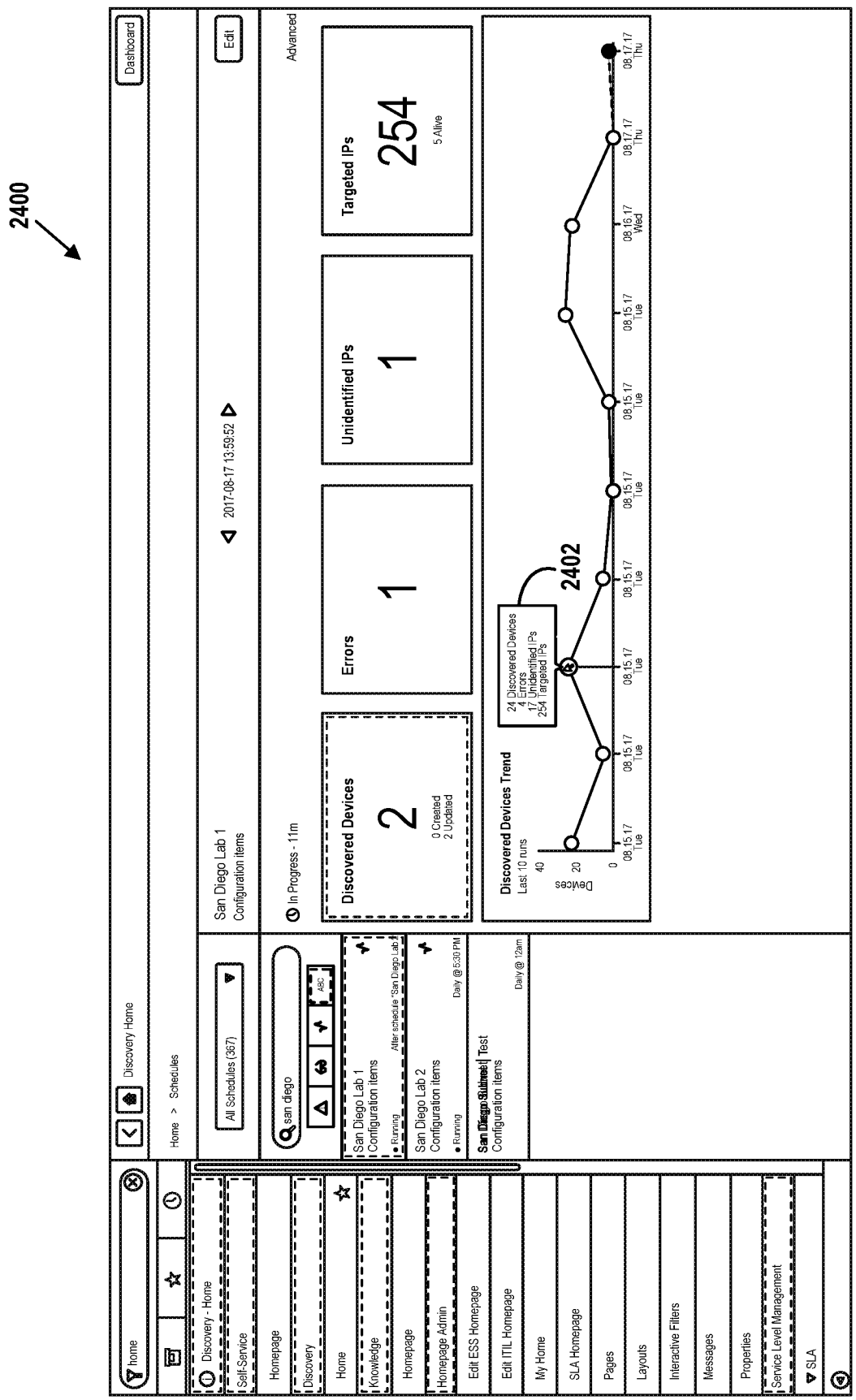
FIG. 24 illustrates an example GUI, in accordance with example embodiments.

FIG. 24 illustrates yet another appearance that a schedule summary GUI may take. As shown in GUI 2400, when the user hovers their mouse cursor near one of the points on the trend graph, a pop-up box 2402 appears listing number totals from one of the times the selected schedule was run.

Figure 25:
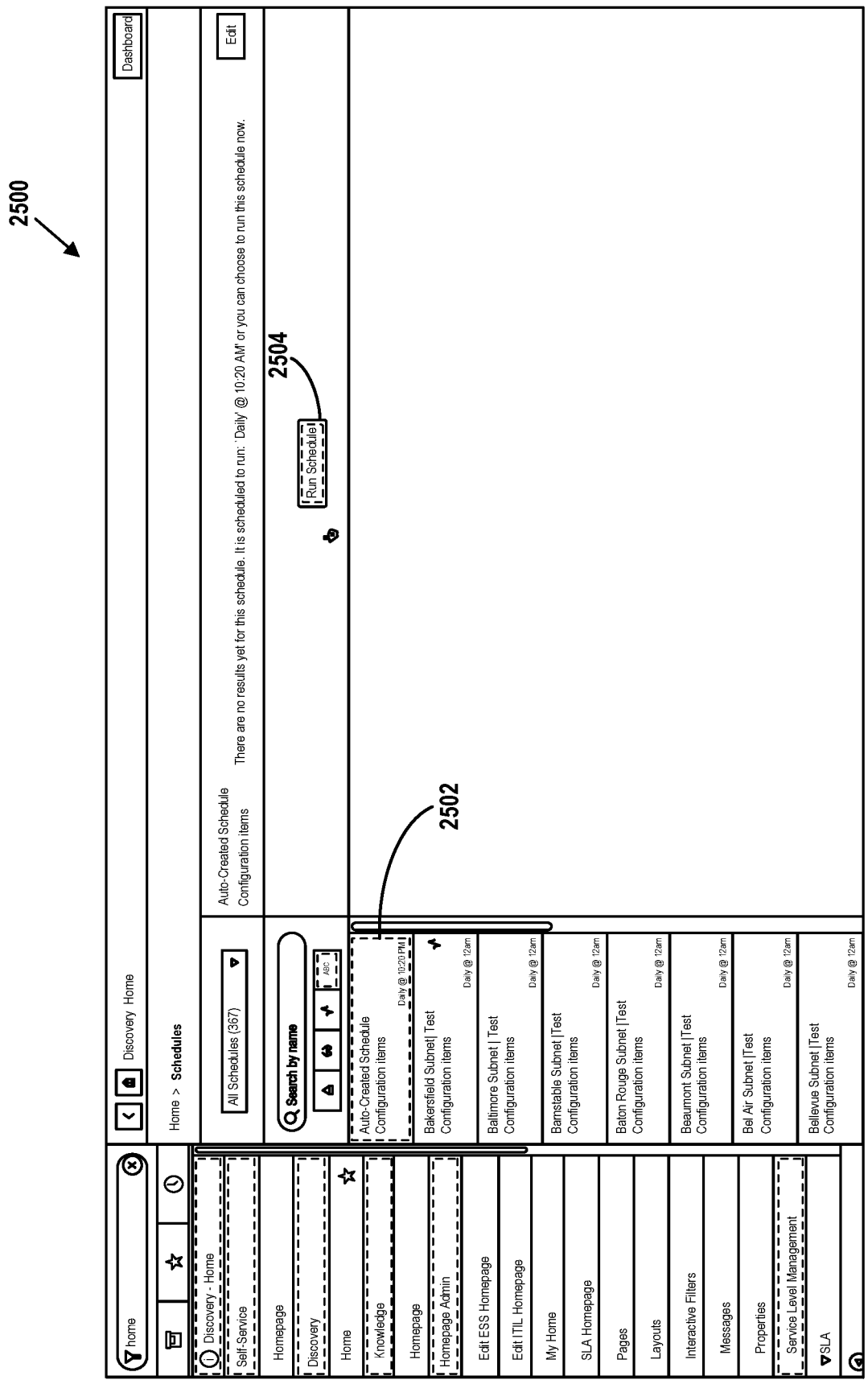
FIG. 25 illustrates an example GUI, in accordance with example embodiments.

FIG. 25 illustrates an example schedule summary GUI 2500 in which schedule 2502 has been selected from a list of schedules, but discovery has not yet been carried out according to schedule 2502, and thus no results have been accumulated for storage in the CMDB. GUI 2500 also includes a selectable option 2504 to run the schedule for the first time.

Figure 26:
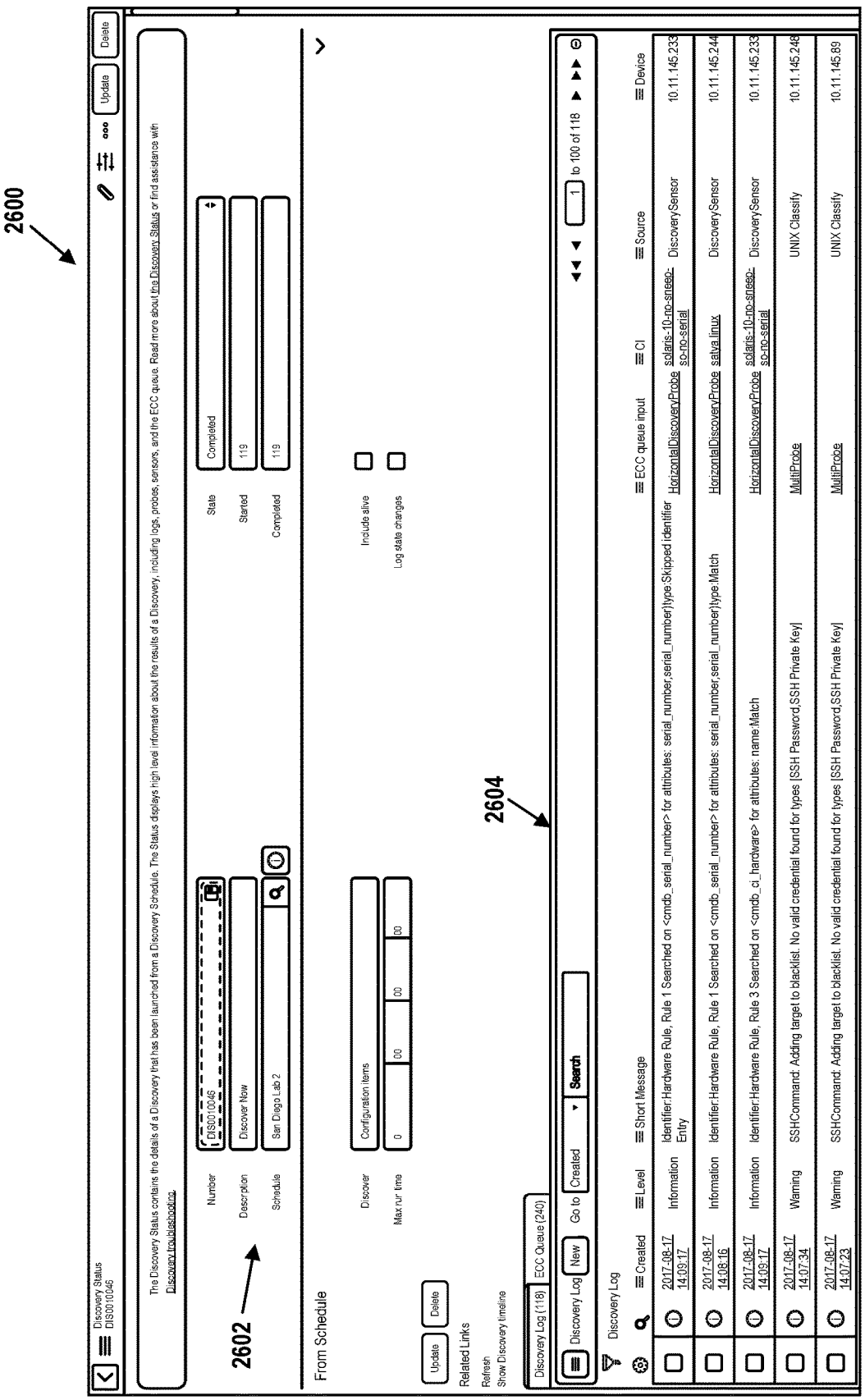
FIG. 26 illustrates an example GUI, in accordance with example embodiments.

FIG. 26 illustrates a discovery status GUI 2600 including various information associated with a single occurrence of a given schedule. As shown, a first region 2602 includes a variety of metadata associated with the schedule occurrence, and a second region 2604 includes a discovery log table populated with messages accumulated while discovery was carried out according to the schedule.

VII. Example Credential-Less Discovery

In the embodiments discussed above, discovery involves associating an IP address, a group of IP addresses, or an IP address range with a set of credentials (e.g., a userid and password). In order to discover configuration item information related to the devices using each respective IP address, a proxy server application executing on a proxy server in a managed network iterates through a list of such associations, probing the specified IP addresses. Particularly, the proxy server application may use the credentials associated with a particular IP address to log on to or otherwise access the device configured with the particular IP address.

This form of discovery is limited to being able to discover devices configured with known IP addresses for which credentials are also known. If a new subnet of IP addresses is added to the network, but these IP addresses are not associated with any credentials, discovery will not take place for devices configured with the IP addresses. Additionally, if a new device begins using an IP address for which a set of credentials are associated, but these credentials cannot be used to log in to or access the new device (e.g., the credentials are incorrect or otherwise misconfigured), this new device will also not be discovered.

In order to overcome these limitations, credential-less discovery may be employed. Credential-less discovery is a simpler form of discovery that does not require credentials to be known. Instead, the credential-less discovery process involves identifying an IP address for which credentials are not configured, and probing certain TCP and/or UDP ports of the IP address to identify basic information about the device using the IP address.

As noted above, if TCP port 135 is open, then the device is likely executing a WINDOWS® operating system. Similarly, if TCP port 22 is open, then the device is likely executing a UNIX® operating system, such as LINUX®. With this understanding, credential-less discovery of a device may proceed as far as it can, without credentials, to identify configuration items associated with the device. In many cases, the operating system of the device and a list of open ports may be able to be determined. In some cases, more or less information may be able to be determined. Regardless of the efficacy of credential-less discovery, any configuration items identified therewith may be stored in the CMDB.

Advantageously, credential-less discovery may be able to provide information regarding unknown devices on a network that would not be found by credentialed discovery. In some embodiments, credential-less discovery may be used as a fallback procedure when credentialed discovery fails for a particular IP address or device. Both credentialed and credential-less discovery may be operated and controlled by way of the proxy server application.

One possible embodiment of credential-less discovery may involve using functionality similar to that of the open-source NMAP software. In fact, a standard or modified NMAP implementation can be invoked to facilitate credential-less discovery. Other possibilities exist.

Additional embodiments may include triggered discovery. Triggered discovery may involve an application (either a proxy server application operating in a managed network or some other application operating on an associated computational instance) dynamically invoking credentialed or credential-less discovery on a particular IP address, set of IP addresses, or range of IP addresses.

For example, a security operations application may involve monitoring a network for suspicious network traffic. Examples of suspicious traffic may include unauthorized port scans, repeated failures of log in attempts to a particular device, and so on. When such an event is detected, the security operations application may remotely cause the proxy server application to perform discovery on the IP address that caused the event (e.g., the IP address of the device that performed the port scan or the IP address of the log in attempts). This results in the CMDB containing an updated snapshot of configuration items associated with the device using the IP address. The security operations application can then take actions in light of this updated information.

Discovery may also be triggered by additional software applications operating on the managed network. For instance, when a dynamic host configuration protocol (DHCP) server assigns an IP address to a new device accessing the managed network, the DHCP server may transmit a request for automatic discovery (most likely credential-less) to be performed on the assigned IP address. In this way, configuration items related to this new device are determined.

In another embodiment, an IT trouble ticket is opened using an application on the managed network's computational instance. If the trouble ticket identifies an IP address of a device, discovery may be automatically invoked on that device, and the results may be added to the trouble ticket. In this way, when the trouble ticket is viewed or otherwise processed, a snapshot of the potentially problematic device is available.

Another possible use for both credentialed and credential-less discovery is change management and verification. A common IT operation is to upgrade or otherwise change the hardware and/or software configuration of a device. In some cases, upgrading a particular software application may require first upgrading one or more other applications on which the particular software application depends. For example, upgrading a web server application may involve upgrading a database application used by the web server application, and upgrading the database application may involve upgrading the operating system of the device. As a consequence, the overall upgrade procedure may involve multiple steps.

It may be desirable for discovery to be performed at the beginning and end of this procedure, as well as between each of these steps. In the example, discovery may be initially performed to determine the current version of the device's operating system, database application, and web server application. Then, the operating system upgrade may take place. Discovery may be invoked in order to confirm that the operating system upgrade has been successful. For instance, discovery may be able to report that the version number of the operating system has the expected value. Then, the upgrade of the database application may take place. Discovery may be invoked again in order to confirm that this upgrade has been successful (e.g., that the version number of the database application has the expected value). Then, the upgrade of the web server application may take place. Discovery may be invoked once more in order to confirm that this upgrade has been successful (e.g., that the version number of the web server application has the expected value).

In some cases, these activities may be mediated by an application operating on the managed network's computational instance. The application may automatically cause discovery to occur before, between, and/or after certain changes that are specified by the application. Advantageously, the individual performing the change does not need to manually invoke discovery (and does not need to be explicitly given permission to do so).

When chained upgrade procedures, such as the one discussed above, are automated, discovery may be added to the automation scripts. In this way, if the upgrade fails in some manner, the discovery snapshots of the device's configuration may be used to determine at which step(s) the failure (or an unexpected result) occurred.

VIII. Example Operations

FIG. 27 is a flow chart illustrating an example embodiment. The process illustrated by FIG. 27 may be carried out by a computing device, such as computing device 100, a computational instance, such as computational instance 322, and/or a cluster of computing devices, such as server cluster 200. However, the process can be carried out by other types of devices or device subsystems. For example, the process could be carried out by a portable computer, such as a laptop or a tablet device.

The embodiments of FIG. 27 may be simplified by the removal of any one or more of the features shown therein. Further, these embodiments may be combined with features, aspects, and/or implementations of any of the previous figures or otherwise described herein.

Block 2700 may involve providing for display, on a graphical user interface, a discovery schedule creation page for creating a discovery schedule, where the discovery schedule creation page includes selectable options defining when to carry out a discovery process in which one or more proxy servers on a managed network determine and provide to a remote network management platform discovery information relating to configuration items of the managed network, where the configuration items include one or more of computing devices, software applications, and configurational relationships therebetween.

Block 2702 may involve, in response to receiving, by way of the graphical user interface, user input indicative of creation of the discovery schedule via the discovery schedule creation page, providing for display, on the graphical user interface, a discovery process page, where providing the discovery process page includes: (i) while the discovery process is being carried out according to the discovery schedule, dynamically updating the discovery process page to include total numbers of discovery results, the discovery results including (a) discovered configuration items, (b) errors relating to the discovery process, and (c) unidentified network addresses associated with configuration items that are not included in the discovered configuration items, and (ii) displaying, in the discovery process page, a total number of created discovery schedules according to which the discovery process has been or is being carried out, where the discovered configuration items as displayed include a first selectable link for navigating to and displaying a discovered configuration items page that lists, for each of a plurality of configuration item types, a total number of discovered configuration items, where the errors as displayed include a second selectable link for navigating to and displaying an error flow page that lists, for each of a plurality of error types, a total number of errors relating to the discovery process, and provides selectable links for displaying information indicating causes for each of the errors, and where the created discovery schedules as displayed include a third selectable link for navigating to and displaying a scheduling summary page that includes, for the discovery schedule, total numbers for categories including discovered configuration items, errors, and unidentified network addresses, where each of the categories as displayed is selectable for triggering display of a trend graph in the scheduling summary page, the trend graph indicating the total numbers for the category resulting from one or more past occurrences of the discovery process according to the discovery schedule, and where the scheduling summary page further includes selectable options for using each of the categories as a basis for sorting the discovery schedule.

In some embodiments, the selectable options defining when to carry out the discovery process may include options to schedule the discovery process to be carried out one or more of: (i) daily at a specified time each day, or (ii) weekly at a specified time each week. In further embodiments, the specified time each day may be limited to a predefined window of off-peak hours.

In some embodiments, the error flow page may include, for each of the plurality of error types, a selectable link that, when selected upon receipt of additional user input by way of the graphical user interface, causes display of a distinct error sub-type summary page that lists, for each of a plurality of error sub-types, a total number of sub-type errors relating to the discovery process. In these embodiments, the plurality of error sub-types may include sub-types of network errors, sub-types of credentials errors, sub-types of configuration errors, sub-types of performance errors, and sub-types of configuration management database errors.

In some embodiments, the distinct error sub-type summary page may include, for each of the error sub-types, a selectable link that, when selected upon receipt of additional user input by way of the graphical user interface, causes display of an error sub-type table page that lists errors of the sub-type relating to the discovery process.

In some embodiments, the trend graph may include, for each of the one or more past occurrences of the discovery process according to the discovery schedule, a selectable option that, when selected upon receipt of additional user input by way of the graphical user interface, causes display of a pop-up window overlaying at least a portion of the trend graph and including the total numbers resulting from the past occurrence of the discovery process according to the discovery schedule.

In some embodiments, the unidentified network addresses may include a selectable link that, when selected upon receipt of additional user input by way of the graphical user interface, causes display of, in a region of the discovery process page, characteristics of each discovered configuration item having one of the unidentified network addresses.

In some embodiments, the discovered configuration items page may include, for each of the plurality of configuration item types, a selectable link that, when selected upon receipt of additional user input by way of the graphical user interface, causes display of a detailed list page including a list of configuration items of the configuration item type.

In some embodiments, the process illustrated by FIG. 27 may involve, before providing for display the discovery schedule creation page, providing for display, on the graphical user interface, a configuration item type selection page including selectable options defining which configuration item types to discover when carrying out the discovery process according to the discovery schedule. In these embodiments, the act of providing for display the discovery schedule creation page may be performed in response to receiving, by way of the graphical user interface, additional user input indicative of at least one of the selectable options defining which configuration item types to discover when carrying out the discovery process according to the discovery schedule.

In some embodiments, a particular discovery result of the discovery results and the total number corresponding to the discovery result may be displayed in the discovery process page in the form of a respective rectangular box in which (i) a name of the discovery result is disposed between a top border and a center of the rectangular box, (ii) the total number is disposed about the center of the rectangular box, and (iii) the selectable link is disposed between a bottom border and the center of the rectangular box.

In some embodiments, a computational instance of a discovery system operating on the remote network management platform may perform the discovery process according to the discovery schedule. In these embodiments, the act of performing the discovery process according to the discovery schedule may involve (i) instructing the one or more proxy servers to determine and provide to the computational instance the discovery information relating to the configuration items of the managed network, the discovery information including identifications and classifications of the configuration items, (ii) receiving the discovery information from the one or more proxy servers, and (iii) based on the discovery information, determining the discovery results.

FIG. 28 is a flow chart illustrating another example embodiment. The process illustrated by FIG. 28 may be carried out by a computing device, such as computing device 100, a computational instance, such as computational instance 322, and/or a cluster of computing devices, such as server cluster 200. However, the process can be carried out by other types of devices or device subsystems. For example, the process could be carried out by a portable computer, such as a laptop or a tablet device.

The embodiments of FIG. 28 may be simplified by the removal of any one or more of the features shown therein. Further, these embodiments may be combined with features, aspects, and/or implementations of any of the previous figures or otherwise described herein.

Block 2800 may involve performing, by a computational instance of a discovery system operating on a remote network management platform, a discovery process, where performing the discovery process includes: (i) instructing one or more proxy servers on a managed network to determine and provide, to the computational instance, discovery information relating to configuration items of the managed network, where the configuration items include one or more of computing devices, software applications, and configurational relationships therebetween, the discovery information including identifications and classifications of the configuration items; (ii) receiving the discovery information from the one or more proxy servers; and (iii) based on the discovery information, determining (a) the configuration items discovered during the discovery process, (b) errors relating to the discovery process, and (c) unidentified network addresses associated with configuration items that are not included in the discovery information.

Block 2802 may involve, during and after performing the discovery process, providing for display, by the computational instance, dynamic updates to a graphical user interface that includes respective total numbers of the configuration items discovered during the discovery process, the errors, and the unidentified network addresses, where the graphical user interface further includes a total number of defined schedules according to which the discovery process has been or is being carried out.

In some embodiments, the discovery information may include identifications and classifications of the configuration items, and further includes information relating to operational states and software applications executing on the configuration items.

In some embodiments, in response to receiving the discovery information from the one or more proxy servers, the computational instance may store the discovery information in a configuration management database of the computational instance.

In some embodiments, the graphical user interface may include a selectable link that, when selected upon receipt of user input by way of the graphical user interface, causes display of a discovered configuration items page that lists, for each of a plurality of configuration item types, a total number of discovered configuration items.

In some embodiments, the graphical user interface may include a selectable link that, when selected upon receipt of user input by way of the graphical user interface, causes display of an error flow page that lists, for each of a plurality of error types, a total number of errors relating to the discovery process, and provides selectable links that, when selected upon receipt of additional user input by way of the graphical user interface, cause display of information indicating causes for each of the errors.

In some embodiments, the total number of defined schedules may include one or more defined schedules, and the graphical user interface may include a selectable link that, when selected upon receipt of user input by way of the graphical user interface, causes display of a scheduling summary page that includes, for each of the one or more defined schedules according to which the discovery process has been or is being carried out: (i) total numbers of configuration items, errors, and unidentified network addresses discovered during the defined schedule, and (ii) a trend graph indicating, from one or more past occurrences of the discovery process according to the defined schedule, the total numbers of the configuration items, the errors, and the unidentified network addresses discovered during the defined schedule.

In some embodiments, the scheduling summary page may further include, for each of the one or more defined schedules according to which the discovery process has been or is being carried out, a total number of network addresses targeted by the discovery process, and wherein the trend graph further indicates, from one or more past occurrences of the discovery process according to the defined schedule, total numbers of the network addresses targeted by the discovery process.

IX. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long-term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a processor; and
a memory, wherein the memory includes instructions, that when executed by the processor, cause the processor to:
transmit a graphical user interface (GUI) for display on a client device, wherein the GUI is configured to provide one or more user-configurable options for defining a discovery process associated with a managed network;
receive one or more user inputs from the client device that correspond to the one or more user-configurable options for defining the discovery process;
receive information associated with a plurality of configuration items in the managed network while the discovery process is executed against the managed network; and
transmit the received information associated with the plurality of configuration items to the client device, wherein the GUI is configured to dynamically update to include one or more discovered configuration items, one or more errors associated with execution of the discovery process, and one or more unidentified network addresses based on the received information.

2. The system of claim 1, wherein the user-configurable options comprise one or more types of configuration items to discover, one or more subnets within the managed network to discover, a time for execution of the discovery process, or a frequency for execution of the discovery process, or any combination thereof.

3. The system of claim 1, wherein the GUI is configured to provide a navigational link, that upon selection by a user, displays a plurality of configuration item types and a total number of discovered configuration items for each configuration item type of the plurality of configuration item types.

4. The system of claim 1, wherein the GUI is configured to provide a navigational link, that upon selection by a user, displays a plurality of error types, a total number of errors for each error type of the plurality of error types, and additional navigational links, that upon selection by the user, display information indicating one or more causes for each error.

5. The system of claim 1, wherein the GUI is configured to provide a navigational link, that upon selection by a user, displays one or more characteristics of the one or more unidentified network addresses based on the received information.

6. The system of claim 1, wherein the GUI is configured to provide a navigational link, that upon selection by a user, displays a trend graph that includes a total number of discovered configuration items, a total number of errors, or a total number of unidentified network addresses resulting from repeat execution of the discovery process over a period of time.

7. The system of claim 1, wherein the one or more user inputs are indicative of a selection of one or more proxy servers from a list of configured proxy servers associated with the managed network, and the instructions cause the processor to execute the discovery process against the managed network via the one or more proxy servers based on the one or more user inputs.

8. A method comprising:
executing a user-configurable discovery process against a managed network, wherein the user-configurable discovery process is defined via one or more user inputs received from a graphical user interface (GUI) displayed on a client device;
receiving information associated with a plurality of configuration items in the managed network while the user-configurable discovery process is executed against the managed network; and
transmitting the received information associated with the plurality of configuration items to the client device, wherein the GUI is configured to dynamically update to include one or more discovered configuration items, one or more errors associated with execution of the user-configurable discovery process, and one or more unidentified network addresses based on the received information.

9. The method of claim 8, wherein the one or more user inputs comprise one or more types of configuration items to discover, one or more subnets within the managed network to discover, a time for execution of the user-configurable discovery process, or a frequency for execution of the user-configurable discovery process, or any combination thereof.

10. The method of claim 8, wherein the GUI is configured to provide a navigational link, that upon selection by a user, displays a plurality of configuration item types and a total number of discovered configuration items for each configuration item type of the plurality of configuration item types.

11. The method of claim 8, wherein the GUI is configured to provide a navigational link, that upon selection by a user, displays a plurality of error types, a total number of errors for each error type of the plurality of error types, and additional navigational links, that upon selection by the user, display information indicating one or more causes for each error.

12. The method of claim 8, wherein the GUI is configured to provide a navigational link, that upon selection by a user, displays one or more characteristics of the one or more unidentified network addresses based on the received information.

13. The method of claim 8, wherein the GUI is configured to provide a navigational link, that upon selection by a user, displays a trend graph that includes a total number of discovered configuration items, a total number of errors, or a total number of unidentified network addresses resulting from repeat execution of the user-configurable discovery process over a period of time.

14. The method of claim 8, comprising storing the received information in a configuration management database.

15. A tangible, non-transitory, computer-readable medium, comprising instructions that, when executed by one or more processors, cause the one or more processors to:
execute a user-configurable discovery process against a managed network, wherein the user-configurable discovery process is defined via one or more user inputs received from a graphical user interface (GUI) displayed on a client device, and wherein the one or more user inputs cause one or more proxy servers to initiate discovery of respective subnets of the managed network at a particular time;
receive information associated with a plurality of configuration items in the managed network while the user-configurable discovery process is executed against the managed network, wherein the plurality of configuration items comprises one or more computing devices and one or more software applications associated with the managed network; and
transmit the received information associated with the plurality of configuration items to the client device, wherein the GUI is configured to update to include one or more discovered configuration items, one or more errors associated with execution of the user-configurable discovery process, and one or more unidentified network addresses based on the received information, while the user-configurable discovery process is being executed.

16. The tangible, non-transitory computer readable medium of claim 15, wherein the one or more user inputs comprise one or more types of configuration items to discover or a frequency for execution of the user-configurable discovery process, or both.

17. The tangible, non-transitory computer readable medium of claim 15, wherein the GUI is configured to provide a navigational link, that upon selection by a user, displays a plurality of configuration item types and a total number of discovered configuration items for each configuration item type of the plurality of configuration item types.

18. The tangible, non-transitory computer readable medium of claim 15, wherein the GUI is configured to provide a navigational link, that upon selection by a user, displays a plurality of error types, a total number of errors for each error type of the plurality of error types, and additional navigational links, that upon selection by the user, display information indicating one or more causes for each error.

19. The tangible, non-transitory computer readable medium of claim 15, wherein the GUI is configured to provide a navigational link, that upon selection by a user, displays one or more characteristics of the one or more unidentified network addresses based on the received information.

20. The tangible, non-transitory computer readable medium of claim 15, wherein the GUI is configured to provide a navigational link, that upon selection by a user, displays a trend graph that includes a total number of discovered configuration items, a total number of errors, or a total number of unidentified network addresses resulting from repeat execution of the user-configurable discovery process over a period of time.

* * * * *